United States Patent
Zhang et al.

(10) Patent No.: US 10,630,383 B2
(45) Date of Patent: Apr. 21, 2020

(54) CM, HFC NETWORK FAULT LOCATING SYSTEM, AND FAULT DETECTION METHOD

(71) Applicant: Huawei Technologies Co., Ltd., Shenzhen, Guangdong (CN)

(72) Inventors: Xiaolong Zhang, Wuhan (CN); Tao Ouyang, Wuhan (CN); Li Zhang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/230,100

(22) Filed: Dec. 21, 2018

(65) Prior Publication Data

US 2019/0123818 A1 Apr. 25, 2019

Related U.S. Application Data

(63) Continuation of application No. PCT/CN2016/086898, filed on Jun. 23, 2016.

(51) Int. Cl.
*H04B 10/2507* (2013.01)
*H04B 10/079* (2013.01)
(Continued)

(52) U.S. Cl.
CPC ..... *H04B 10/0791* (2013.01); *H04B 10/0795* (2013.01); *H04B 10/2507* (2013.01);
(Continued)

(58) Field of Classification Search
CPC combination set(s) only.
See application file for complete search history.

(56) References Cited

U.S. PATENT DOCUMENTS

| 7,164,697 B1 * | 1/2007 | Beser | H04L 12/2801 370/485 |
| 2002/0026523 A1 * | 2/2002 | Mallory | H04L 1/0003 709/236 |

(Continued)

FOREIGN PATENT DOCUMENTS

| CN | 1442004 A | 9/2003 |
| WO | 0186856 A2 | 11/2001 |

OTHER PUBLICATIONS

CableLabs, Data-Over-Cable Service Interface Specifications DOCSIS® 3.1, Physical Layer Specification, CM-SP-PHYv3.1-I06-150611, Jun. 11, 2015, 243 pages.
(Continued)

*Primary Examiner* — Omar S Ismail
(74) *Attorney, Agent, or Firm* — Kilpatrick Townsend & Stockton LLP

(57) ABSTRACT

A cable modem (CM), a hybrid fiber coaxial (HFC) network fault locating system, and a fault detection method are provided. The CM can not only detect intrusion noise outside a carrier and white noise, but also detect other fault problems, such as non-linear distortion, pulse noise, intrusion noise on a carrier, and linear distortion. The system includes a direction-selective apparatus. The apparatus can allow only an upstream signal entered from an output port of the apparatus to be transmitted to a CM to which a branch port of the apparatus is connected, without allowing an upstream signal entered from an input port of the apparatus to be transmitted to the CM to which the branch port of the apparatus is connected, so that once detecting a fault from the upstream signal, the CM can accurately determine, through locating, that the fault in an HFC network is located on an output port side of the apparatus.

15 Claims, 30 Drawing Sheets

(51) Int. Cl.
*H04L 12/28* (2006.01)
*H04B 10/2575* (2013.01)
*H04L 12/26* (2006.01)
*H04N 21/61* (2011.01)

(52) U.S. Cl.
CPC ..... *H04B 10/2575* (2013.01); *H04L 12/2801* (2013.01); *H04L 43/00* (2013.01); *H04N 21/6168* (2013.01)

(56) References Cited

U.S. PATENT DOCUMENTS

| | | | | |
|---|---|---|---|---|
| 2002/0031120 | A1* | 3/2002 | Rakib | G08B 13/19656 370/386 |
| 2002/0059637 | A1* | 5/2002 | Rakib | G08B 13/19656 725/119 |
| 2002/0136231 | A1* | 9/2002 | Leatherbury | H04L 12/2801 370/442 |
| 2004/0218606 | A1* | 11/2004 | Leatherbury | H04N 21/6118 370/395.5 |
| 2006/0120282 | A1* | 6/2006 | Carlson | H04L 12/2801 370/229 |
| 2006/0269285 | A1* | 11/2006 | Farmer | H04J 3/0664 398/72 |
| 2008/0170853 | A1* | 7/2008 | Rakib | H04L 12/2801 398/26 |
| 2011/0185263 | A1* | 7/2011 | Chapman | H04L 12/2801 714/776 |
| 2012/0275792 | A1* | 11/2012 | Nandiraju | H04L 12/2801 398/66 |
| 2013/0125194 | A1* | 5/2013 | Finkelstein | H04L 12/2801 725/129 |
| 2013/0265444 | A1* | 10/2013 | Walsh | H04B 10/073 348/192 |
| 2016/0099778 | A1* | 4/2016 | Maricevic | H04B 10/2575 398/115 |
| 2017/0303273 | A1* | 10/2017 | Jin | H04L 67/16 |

OTHER PUBLICATIONS

CableLabs, Data-Over-Cable Service Interface Specifications DOCSIS® 3.1, CCAP™ Operations Support System Interface Specification, CM-SP-CCAP-OSSIv3.1-I06-151210, Dec. 10, 2015, 703 pages.
CableLabs,Data-Over-Cable Service Interface Specifications DOCSIS® 3.1, Cable Modem Operations Support System InterfaceSpecification, CM-SP-CM-OSSIv3.1-I06-151210. Dec. 10, 2015, 288 pages.
CableLabs, Data-Over-Cable Service Interface Specifications DOCSIS® 3.1, MAC and Upper Layer Protocols Interface Specification, CM-SP-MULPIv3.1-I07-150910, Sep. 10, 2015, 816 pages.

* cited by examiner

| | Service flow identifier (SID) | Interval usage code (IUC) | Offset=0 |
|---|---|---|---|
| First time interval | | | |
| Second time interval | Service flow identifier | Interval usage code | Offset |
| ⋮ | ⋮ | | ⋮ |
| Last time interval | Service flow identifier | Interval usage code | Offset |
| End of a list (null information element (Null IE)) | Service flow identifier=0 | Interval usage code=7 | Offset=MAP message length |
| | Service flow identifier | Interval usage code | Offset=MAP message length |
| Determine and suspend data authorization | ⋮ | | ⋮ |
| | Service flow identifier | Interval usage code | Offset=MAP message length |

FIG. 4

| | Service flow identifier | Modulation error ratio | Power | Equalization | Stagger | Quantity of frames | Quantity of symbol offsets | Start subcarrier | Quantity of skipped subcarriers |
|---|---|---|---|---|---|---|---|---|---|
| First probe information element | | | | | | | | | |
| Second probe information element | | | | | | | | | |
| ... | | | | | | | | | |
| Last probe information element | | | | | | | | | |

FIG. 5

CM, HFC NETWORK FAULT LOCATING SYSTEM, AND FAULT DETECTION METHOD

CROSS-REFERENCE TO RELATED APPLICATIONS

This application is a continuation of International Application No. PCT/CN2016/086898, filed on Jun. 23, 2016, the disclosure of which is hereby incorporated by reference in its entirety.

TECHNICAL FIELD

The present application relates to the field of communications technologies, and in particular, to a cable modem (CM), a hybrid fiber coaxial (HFC) network fault locating system, and a fault detection method.

BACKGROUND

An HFC network technology is an economical and practical integrated digital service broadband network access technology. An HFC generally includes three parts: an optical fiber trunk, a coaxial cable branch, and a subscriber distribution network. A program signal from a cable television broadcast station is first transformed into an optical signal to be transmitted on a trunk; then the optical signal is converted into an electrical signal after arriving at a user area; and finally the electrical signal is sent to a user by using a coaxial cable after being distributed by using a distributor. FIG. 1 shows a typical HFC network. As shown in FIG. 1, the HFC network may include the following devices and components: a network management system, a metropolitan area network, a cable modem termination system (CMTS), an optical station, a CM, a set top box (STB) on a user side, a personal computer (PC), an optical fiber cable, a coaxial cable, an amplifier, a tap, and the like. The components are not shown one by one in FIG. 1.

There are many fault problems because an HFC network is exposed outside in a long term. The existing data over cable service interface specification (DOCSIS) 3.1 standard is used to design a powerful proactive network maintenance (PNM) fault diagnosis function for these problems. A CM and a CMTS may be used to detect a line, and the CMTS tests and analyzes a detection result. However, the CMTS can only detect that quality of an upstream signal deteriorates, but cannot learn of an abrupt point indicating that the quality of the upstream signal deteriorates. If the upstream signal may be measured along an upstream channel, the abrupt point indicating that the quality of the upstream signal deteriorates may be obtained through analysis, so as to find a fault location. Considering that the HFC network includes many CMs, the upstream signal can be detected at the CMs.

A method for extending a downstream full band capture (FBC) function of a CM to an upstream is proposed in the prior art, to detect an upstream signal at the CM. A simplified implementation structure of the method is shown in FIG. 2. In the simplified implementation structure, a branch is led out from the front (namely, a point "1" in FIG. 2) of a duplexer, and the other end of the branch is connected to the front (namely, a point "2" in FIG. 2) of a downstream FBC module. When a switch of the branch is closed, an analog-to-digital converter (ADC) of the FBC module may collect upstream noise, so as to analyze the upstream noise. In this way, the CM has functions of upstream noise collection and upstream noise detection.

However, the CM that detects the upstream signal by using the downstream FBC function can usually only detect whether the upstream signal has two limited noise types: intrusion noise outside a carrier and white noise, but cannot detect other fault problems.

SUMMARY

Embodiments of the present disclosure provide a CM, an HFC network fault locating system, and a fault detection method, so as to resolve an existing problem that a CM can detect only two limited noise types: intrusion noise outside a carrier and white noise.

A first aspect of this application provides a CM, and the CM includes a collection module and an analysis module.

The collection module collects an upstream signal from a downstream of the CM, or collects an upstream signal from an upstream of the CM, or collects an upstream signal from a mixture of an upstream and a downstream of the CM.

The analysis module detects whether the upstream signal has at least one of intrusion noise outside a carrier, white noise, non-linear distortion, pulse noise, intrusion noise on a carrier, or linear distortion.

In a solution provided in this application, a conventional CM is reconstructed, so that the CM can not only detect intrusion noise outside a carrier and white noise, but also detect other fault problems, such as non-linear distortion, pulse noise, intrusion noise on a carrier, and linear distortion.

In a possible design, the collection module may collect the upstream signal in the following three collection manners:

In a first collection manner, the collection module determines, based on an upstream bandwidth allocation mapping message delivered by a CMTS, a time interval corresponding to an empty timeslot or a silent probe signal, and collects the upstream signal within the time interval corresponding to the empty timeslot or the silent probe signal. The upstream bandwidth allocation mapping message is used to indicate a timeslot occupied by each CM under control of the CMTS, and the empty timeslot or the silent probe signal indicates a timeslot that is not occupied by any CM.

In a second collection manner, the collection module determines, based on an upstream bandwidth allocation mapping message delivered by the CMTS, a service flow identifier SID of any one of upstream devices of the CM or downstream devices of the CM, and collects the upstream signal within a time interval corresponding to the SID of the any device.

In a third collection manner, the collection module randomly collects the upstream signal.

In a possible design, when detecting whether the upstream signal has the non-linear distortion, the analysis module is configured to:

draw a histogram based on a time-domain sampling value of the upstream signal; and if the drawn histogram does not conform to Gaussian distribution, determining that the upstream signal has the non-linear distortion.

In a possible design, the collection module further includes a band-pass filter; the collection module collects the upstream signal obtained after passing through the band-pass filter; or the collection module collects the upstream signal, and then inputs the collected upstream signal into the band-pass filter for processing; and a center frequency of the band-pass filter is outside an upstream operating band of the CM.

When detecting whether the upstream signal has the pulse noise, the analysis module is configured to:
if energy in a passband of the band-pass filter reaches a specified threshold, determine that the upstream signal has the pulse noise.

In a possible design, the collection module collects the upstream signal within the time interval corresponding to the empty timeslot or the silent probe signal.

The analysis module is specifically configured to:
if the collection module collects the upstream signal, determine, through spectrum analysis, whether the upstream signal has the intrusion noise on the carrier.

In a possible design, the collection module collects the upstream signal within the time interval corresponding to the SID of the any device.

The analysis module is specifically configured to:
determine whether the upstream signal has the linear distortion.

In a possible design, the analysis module is further configured to:
demodulate the upstream signal to obtain a signal quality parameter of the upstream signal, where the signal quality parameter includes an equalization coefficient, an MER, and a level; and/or
obtain a test signal of the any device; and compare the test signal with the upstream signal to obtain a transmission characteristic of a line between the CM and the any device, where the test signal is an initial state signal obtained when the upstream signal is sent from the any device.

In a possible design, the CM further includes an interface, an upstream sending module, a downstream receiving module, and a duplexer.

The duplexer is connected to the interface, a low-pass filter of the duplexer is connected to the upstream sending module, and a high-pass filter of the duplexer is connected to the downstream receiving module.

The collection module and the analysis module are located on a branch of a line between the duplexer and the interface, or the collection module and the analysis module are located on a branch of a line between the duplexer and the upstream sending module.

A structure of this CM is mainly applied to a frequency division system.

In a possible design, the CM further includes an interface, an upstream sending module, a downstream receiving module, and a circulator.

Three ports of the circulator are respectively connected to the interface, the upstream sending module, and the downstream receiving module, a signal entered from the interface arrives at the downstream receiving module after passing through the circulator, and a signal sent by the upstream sending module is sent from the interface after passing through the circulator.

The collection module and the analysis module are located on a branch of a line between the circulator and the downstream receiving module; or the collection module and the analysis module are located inside the downstream receiving module.

A structure of this CM is mainly applied to an intra-frequency duplex system.

A second aspect of this application provides an HFC network fault locating system, and the system includes a CM and a direction-selective apparatus. The CM has a function of CM behavior in an embodiment of the first aspect. The direction-selective apparatus includes a branch port, an input port, and an output port, the CM is connected to the branch port of the direction-selective apparatus, the input port of the direction-selective apparatus is connected to an upstream of the CM, and the output port of the direction-selective apparatus is connected to a downstream of the CM.

The direction-selective apparatus transmits, to the CM by using the branch port, a first upstream signal that is from the downstream of the CM and that is entered from the output port, and isolates a second upstream signal that is from the downstream of the CM and that is entered from the input port, so that the second upstream signal cannot arrive at the CM. Alternatively, the direction-selective apparatus transmits a second upstream signal to the CM by using the branch port, and isolates a first upstream signal, so that the first upstream signal cannot arrive at the CM.

If the direction-selective apparatus chooses to transmit the first upstream signal to the CM and isolate the second upstream signal, when the CM detects that the first upstream signal has at least one of non-linear distortion, pulse noise, intrusion noise on a carrier, and linear distortion, the CM determines that the at least one of the non-linear distortion, the pulse noise, the intrusion noise on the carrier, and the linear distortion occurs on an output port side of the direction-selective apparatus.

If the direction-selective apparatus chooses to transmit the second upstream signal to the CM and isolate the first upstream signal, when the CM detects that the second upstream signal has at least one of non-linear distortion, pulse noise, intrusion noise on a carrier, and linear distortion, the CM determines that the at least one of the non-linear distortion, the pulse noise, the intrusion noise on the carrier, and the linear distortion occurs on an input port side of the direction-selective apparatus.

A solution provided in this application provides the direction-selective apparatus. The apparatus can allow only an upstream signal entered from the output port of the apparatus to be transmitted to the CM to which the branch port of the apparatus is connected, without allowing an upstream signal entered from the input port of the apparatus to be transmitted to the CM to which the branch port of the apparatus is connected, so that once detecting a fault from the upstream signal, the CM can accurately determine, through locating, that the fault in an HFC network is located on the output port side of the apparatus. Alternatively, the apparatus can allow only an upstream signal entered from the input port of the apparatus to be transmitted to the CM to which the branch port of the apparatus is connected, without allowing an upstream signal entered from the output port of the apparatus to be transmitted to the CM to which the branch port of the apparatus is connected, so that once detecting a fault from the upstream signal, the CM can accurately determine, through locating, that the fault in an HFC network is located on the input port side of the apparatus.

In a possible design, the direction-selective apparatus is further configured to: transmit, to the CM by using the branch port, a downstream signal that is sent by a CMTS to the CM and that is entered from the input port; and transmit, to the CMTS by using the input port, a third upstream signal that is sent by the CM to the CMTS and that is entered from the branch port.

In the foregoing implementation, when the branch port of the direction-selective apparatus is connected to the CM, it can be ensured that a service of the CM is normally performed.

In a possible design, when the direction-selective apparatus transmits the first upstream signal to the CM, and isolates the second upstream signal, the direction-selective apparatus further includes a first tap, a circulator, a first duplexer, a second tap, and a second duplexer.

The output port sends the first upstream signal to the circulator by using a branch link of the first tap; the circulator unidirectionally transmits the first upstream signal to a low-pass filter of the first duplexer; the low-pass filter of the first duplexer transmits the first upstream signal to the CM by using the branch port; the input port sends the second upstream signal to the second duplexer by using a branch link of the second tap; the second duplexer sends the second upstream signal to the circulator by using a low-pass filter of the second duplexer; and then the circulator unidirectionally transmits the second upstream signal to the first tap, and the first tap sends the second upstream signal to the output port by using the branch link of the first tap for sending.

In a possible design, when the direction-selective apparatus transmits the first upstream signal to the CM, and isolates the second upstream signal, the direction-selective apparatus further includes a first tap, a first isolator, a distributor, a second isolator, a first duplexer, a second tap, and a second duplexer.

The output port sends the first upstream signal to the first isolator by using a branch link of the first tap; the first isolator unidirectionally transmits the first upstream signal to the distributor; the distributor transmits the first upstream signal to a low-pass filter of the first duplexer; and the low-pass filter of the first duplexer transmits the first upstream signal to the CM by using the branch port.

The input port sends the second upstream signal to the second duplexer by using a branch link of the second tap; the second duplexer sends the second upstream signal to the second isolator by using a low-pass filter of the second duplexer; and the second isolator prevents the second upstream signal from entering the distributor.

A third aspect of this application provides a fault detection method, and the method is used to detect whether a fault and a specific type of fault occur in an upstream signal that arrives at a CM. A device used in the method may be the CM in an embodiment of the first aspect. For a specific procedure, refer to a detailed description of the CM in the first aspect. Details are not described herein.

BRIEF DESCRIPTION OF DRAWINGS

FIG. 4 is a schematic diagram of a format of a MAP information element in the prior art;

FIG. 5 is a schematic diagram of a format of a probe information element in the prior art;

DESCRIPTION OF EMBODIMENTS

The following describes some terms in this application.

Figure 3:
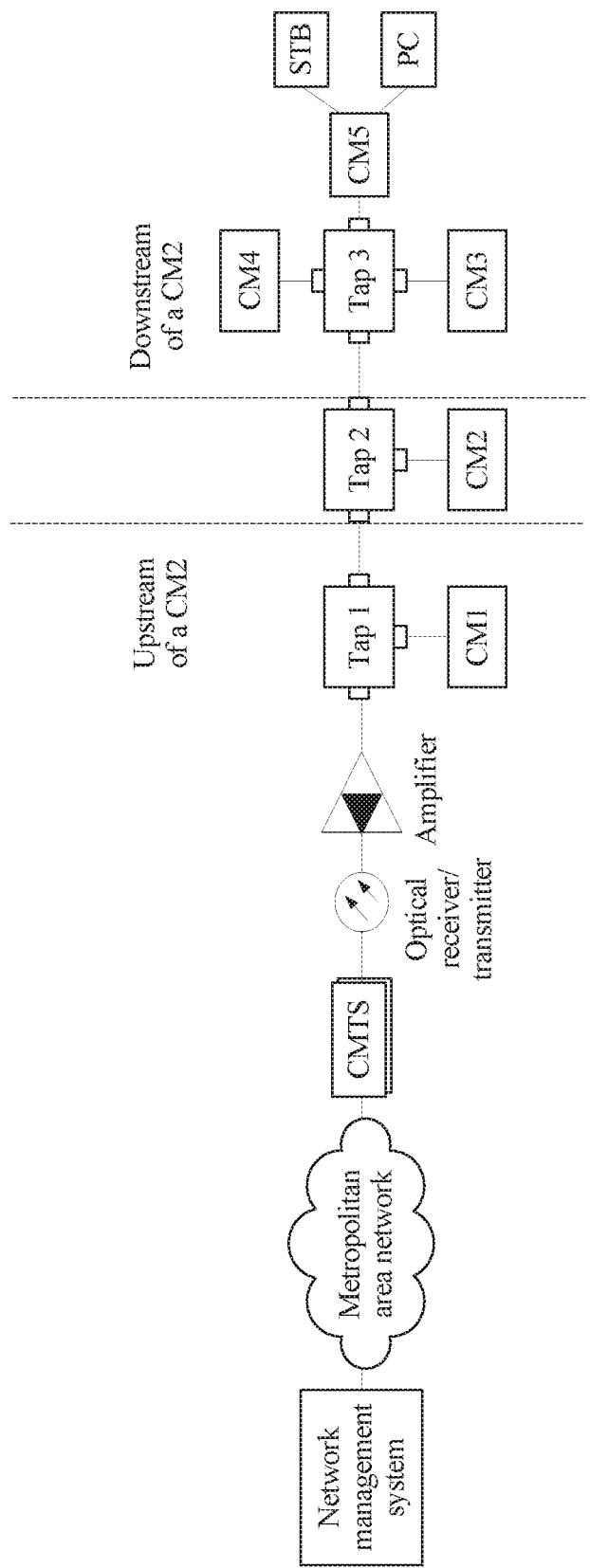
FIG. 3 is a schematic description diagram of an upstream and a downstream of a CM according to an embodiment of this application.

In this application, an "upstream" of a CM is a side that is bounded by the CM and that is close to a CMTS. Similarly, a "downstream" of a CM is a side that is bounded by the CM and that is far away from a CMTS. For example, in FIG. 3, a left side of a CM2 is an upstream of the CM2, and a right side of the CM2 is a downstream of the CM2. A CM1 is located on the upstream of the CM2, and a CM3, a CM4, and a CM5 are located on the downstream of the CM2.

In this application, an "upstream" is sometimes used to represent an input port side of a direction-selective apparatus provided in this application, and a "downstream" is sometimes used to represent an output port side of the direction-selective apparatus.

"Upstream signal": a signal sent by a CM to a CMTS. The upstream signal is usually a low frequency signal, for example, a frequency of the upstream signal may be below 100 megahertz (MHz). Correspondingly, a "downstream signal" is a signal sent by the CMTS to the CM. The downstream signal is usually a high frequency signal. Because frequency bands of the upstream signal and the downstream signal are different, the upstream signal and the downstream signal may be transmitted on a same transmission medium.

"Non-linear distortion": indicates that a new frequency component other than a frequency component of an input signal is generated in a signal transmission process. An HFC network mainly includes gain compression, laser clipping, composite second-order distortion, composite third-order beat, common path distortion, and the like.

"Pulse noise": The noise is characterized by broadband, short duration, generally in microseconds (μs) or milliseconds (ms), and high intensity.

"Intrusion noise": The noise is characterized by narrowband, long or constant duration, and relatively low intensity.

"White noise": noise whose power spectrum density is evenly distributed in entire frequency domain. The noise is characterized by a rise of overall noise floor and long duration.

"Linear distortion": An output signal does not include a new frequency component that is not in an input signal, and an output waveform of each frequency does not change.

"Upstream bandwidth allocation mapping message": It may be referred to as a "MAP message" for short, and be used to specify a specific upstream signal sent by each CM at a time interval corresponding to a specific timeslot. Because an HFC network is a point-to-multipoint network, when each CM sends the upstream signal, all CMs share an upstream channel. Therefore, to prevent upstream signals of all the CMs from colliding, upstream bandwidth allocation needs to be performed. The upstream channel is divided into different segments in terms of frequency and time, and one segment allows only one CM to send the upstream signal. In specific implementation, a CMTS usually periodically allocates upstream bandwidth based on a request of each CM, forms a MAP message from an allocated result, and broadcasts the MAP message to all CMs in a downstream direction. The CM parses the MAP message, and selects a timeslot that belongs to the CM to send the upstream signal.

Currently, there are mainly two MAP messages: a Version 1 MAP message and a Version 5 MAP message. The Version 1 MAP message can be analyzed by devices of the DOCSIS 1.0, the DOCSIS 1.1, the DOCSIS 2.0, the DOCSIS 3.0, and the DOCSIS 3.1, and be used for bandwidth allocation on Time Division Multiple Access (TDMA) and Synchronous Code Division Multiple Access (S-CDMA) upstream channels. The Version 5 MAP message can be analyzed only by a device of the DOCSIS 3.1, and be used for bandwidth allocation on an Orthogonal Frequency Division Multiple Access (OFDMA) upstream channel. The Version 5 MAP message used for bandwidth allocation on the OFDMA upstream channel is divided into two structures based on allocation content: One type is a MAP sub-structure used for non-probe frame allocation, and this structure is similar to the Version 1 MAP message. The other type is a P-MAP (Probe MAP) sub-structure used for probe frame allocation.

The Version 1 MAP message is similar to the structure of the Version 5 MAP message used for non-probe frame allocation, and includes an upstream channel identifier (ID), a MAP information element, and other content. The upstream channel ID identifies an upstream channel for which a current MAP message is used, and the MAP information element describes specific usage of each timeslot and specifies a time of sending an upstream signal by each CM. A structure of the MAP information element is shown in FIG. 4. Each row in FIG. 4 indicates usage of a specific time interval. A service flow identifier (SID) identifies a CM or CMs to which a current time interval belongs, and includes a scenario such as a request, multicast, broadcast, and unicast. An interval usage code (IUC) is used to indicate a signal type of the SID, and currently includes 15 types in total: an IUC1 to an IUC15. An offset is used to indicate a mini-slot offset of the current time interval, namely, a time length. Each CM matches the SID, and selects a timeslot that belongs to the CM to send an upstream signal. For detailed descriptions of the parameters in FIG. 4, refer to the DOCSIS specification "CM-SP-MULPIv3.1".

The Version 5 MAP message used for probe frame allocation includes an upstream channel ID, a probe information element (P-IE), and other content. The upstream channel ID identifies an upstream channel for which a current MAP message is used, and the probe information element describes specific usage of each timeslot, namely, a time and a function of sending a probe signal by each CM. A structure of the probe information element is shown in FIG. 5. Each row in FIG. 5 indicates usage of each time interval, and indicates a specific status of sending the probe signal by the CM. Each CM matches an SID, and selects a timeslot that belongs to the CM to send the probe signal. For detailed descriptions of the parameters in FIG. 5, refer to the DOCSIS specification "CM-SP-MULPIv3.1".

The following describes the technical solutions of this application with reference to the accompanying drawings and embodiments in this specification.

A method for extending a downstream FBC function of a CM to an upstream is proposed in the prior art, to detect an upstream signal at the CM. However, this method for combining upstream signals into FBC for collection and detection by using a switch has the following problems:

First, intrusion noise outside a carrier and white noise can be detected, but other fault problems, such as intrusion noise on a carrier and pulse noise cannot be detected. A reason is that the intrusion noise lasts for a long time or always exists, and the intrusion noise outside the carrier may be collected at any time by switching on a switch. However, if the intrusion noise and a service signal are mixed on a same frequency band, it is difficult to obtain the intrusion noise on the carrier from the same frequency band. Duration of the pulse noise is very short and ranges from 100 ns to 10 ms. Such short duration makes it difficult to capture the pulse noise by switching on a switch.

Second, a tap in an HFC network includes a plurality of ports, including an input port connected to an upstream, an output port connected to a downstream, and a branch port connected to a CM. A signal may be transmitted from one port to any other port. Therefore, a CM in a port detects noise, but cannot know which port of the tap the noise enters from. Consequently, a location of the noise is blur, and the noise cannot be accurately located.

Figure 2:
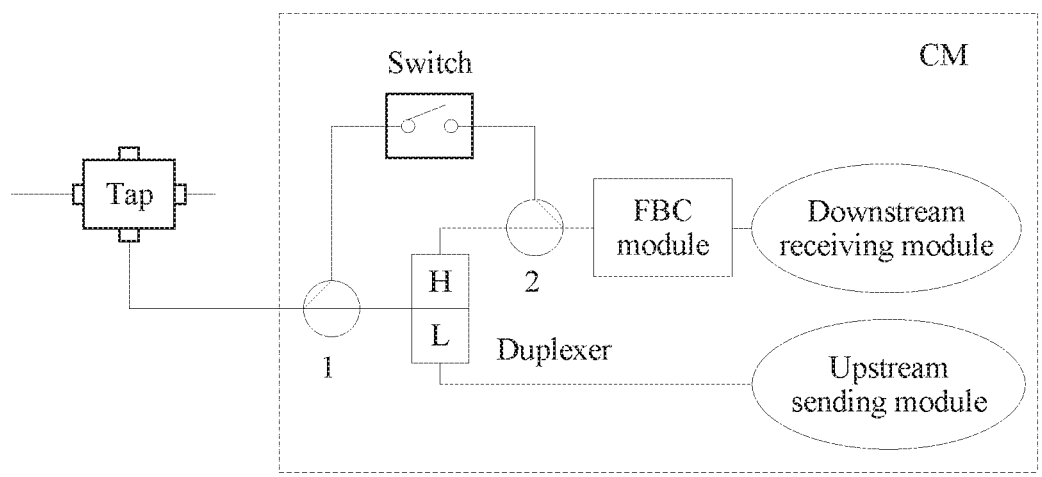
FIG. 2 is a schematic diagram of an implementation structure in which a downstream FBC function of a CM is extended to an upstream in the prior art.

Third, because a switch in FIG. 2 is switched on, some upstream signals are mixed into downstream signals. Consequently, downstream signal collection and analysis and downstream signal parsing are interfered with, a service may be interrupted, and user experience is affected.

Therefore, this application provides a CM, an HFC network fault locating system, and a fault detection method. A conventional CM is reconstructed, so that the CM can not only detect intrusion noise outside a carrier and white noise, but also detect other fault problems, such as non-linear distortion, pulse noise, intrusion noise on a carrier, and linear distortion, and a service is not affected while the CM detects a fault. In addition, this application further provides a direction-selective apparatus. The apparatus can allow only an upstream signal entered from the output port of the apparatus to be transmitted to the CM to which the branch port of the apparatus is connected, without allowing an upstream signal entered from the input port of the apparatus to be transmitted to the CM to which the branch port of the apparatus is connected, so that once detecting a fault from the upstream signal, the CM can accurately determine, through locating, that the fault in an HFC network is located on the output port side of the apparatus. Alternatively, the apparatus can allow only an upstream signal entered from the input port of the apparatus to be transmitted to the CM to which the branch port of the apparatus is connected, without allowing an upstream signal entered from the output port of the apparatus to be transmitted to the CM to which the branch port of the apparatus is connected, so that once detecting a fault from the upstream signal, the CM can accurately determine, through locating, that the fault in an HFC network is located on the input port side of the apparatus.

The following first describes a CM that has an upstream signal collection and analysis function provided in this application. The CM may have a plurality of structures. This application is described only by using the following four structures as an example.

Figure 6A:
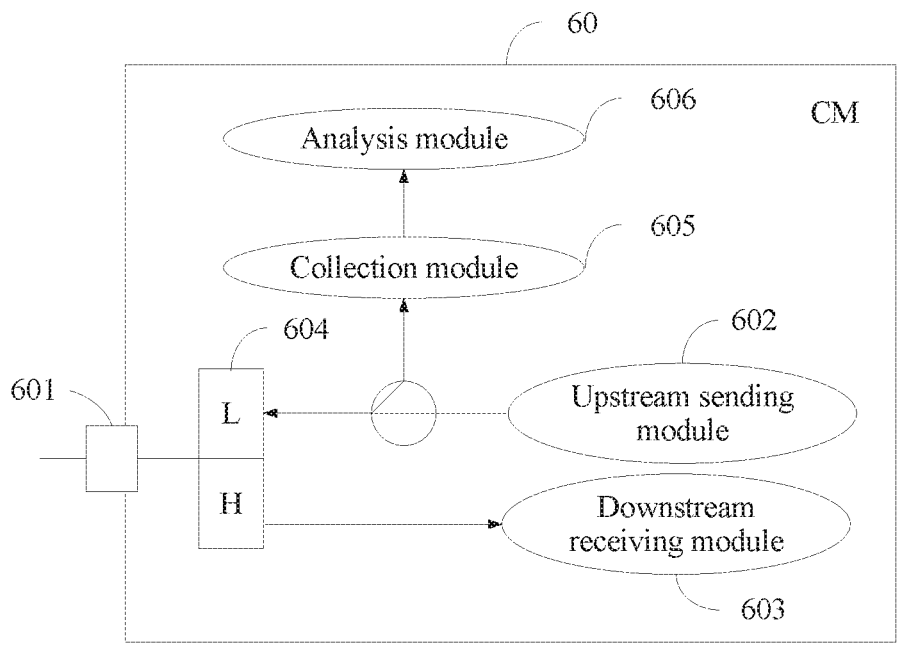
FIG. 6A is a schematic structural diagram of a first CM according to an embodiment of this application.

A first possible structure of a CM 60 is shown in FIG. 6A, and includes an interface 601, an upstream sending module 602, a downstream receiving module 603, a duplexer 604, a collection module 605, and an analysis module 606. The interface 601, the upstream sending module 602, the downstream receiving module 603, and the duplexer 604 are common modules of a current conventional CM. The collection module 605 and the analysis module 606 are modules newly added to the CM 60 in this application. The duplexer 604 is connected to the interface 601, a low-pass filter (namely, "L" in FIG. 6A) of the duplexer 604 is connected to the upstream sending module 602, and a high-pass filter (namely, "H" in FIG. 6A) of the duplexer 604 is connected to the downstream receiving module 603. The collection module 605 and the analysis module 606 are located on a branch of a line between the duplexer 604 and the upstream sending module 602.

Figure 6B:
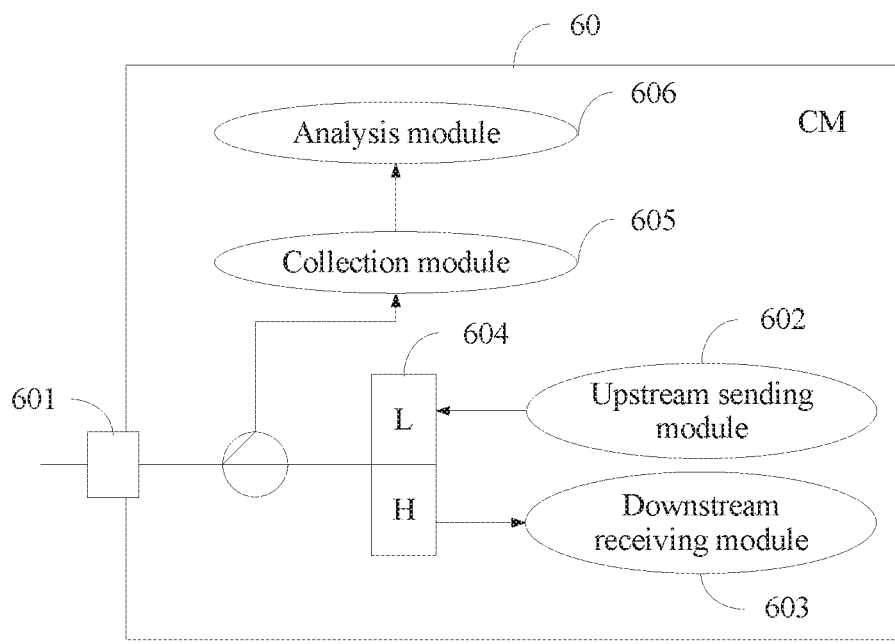
FIG. 6B is a schematic structural diagram of a second CM according to an embodiment of this application.

A second possible structure of a CM 60 is shown in FIG. 6B, and includes an interface 601, an upstream sending module 602, a downstream receiving module 603, a duplexer 604, a collection module 605, and an analysis module 606. The duplexer 604 is connected to the interface 601, a low-pass filter of the duplexer 604 is connected to the upstream sending module 602, and a high-pass filter of the duplexer 604 is connected to the downstream receiving module 603. The collection module 605 and the analysis module 606 are located on a branch of a line between the duplexer 604 and the interface 601.

Figure 6C:
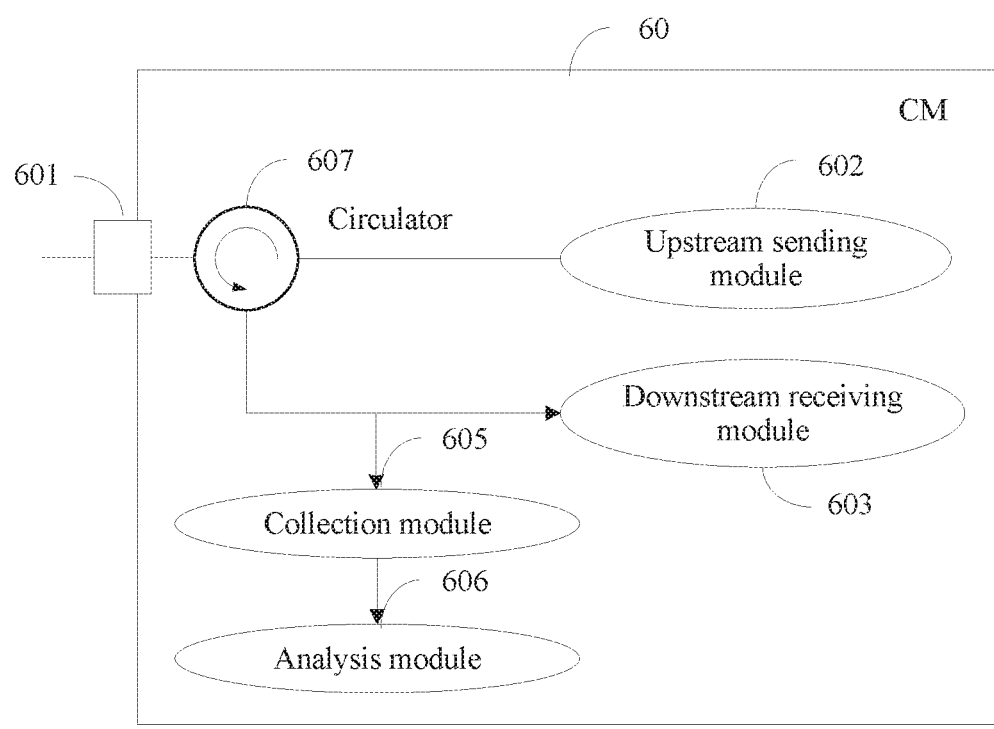
FIG. 6C is a schematic structural diagram of a third CM according to an embodiment of this application.

A third possible structure of a CM 60 is shown in FIG. 6C, and includes an interface 601, an upstream sending module 602, a downstream receiving module 603, a collection module 605, an analysis module 606, and a circulator 607. Three ports of the circulator 607 are respectively connected to the interface 601, the upstream sending module 602, and the downstream receiving module 603, a signal entered from the interface 601 arrives at the downstream receiving module 603 after passing through the circulator 607, and a signal sent by the upstream sending module 602 is sent from the interface 601 after passing through the circulator 607. The collection module 605 and the analysis module 606 are located on a branch of a line between the circulator 607 and the downstream receiving module 603.

Figure 6D:
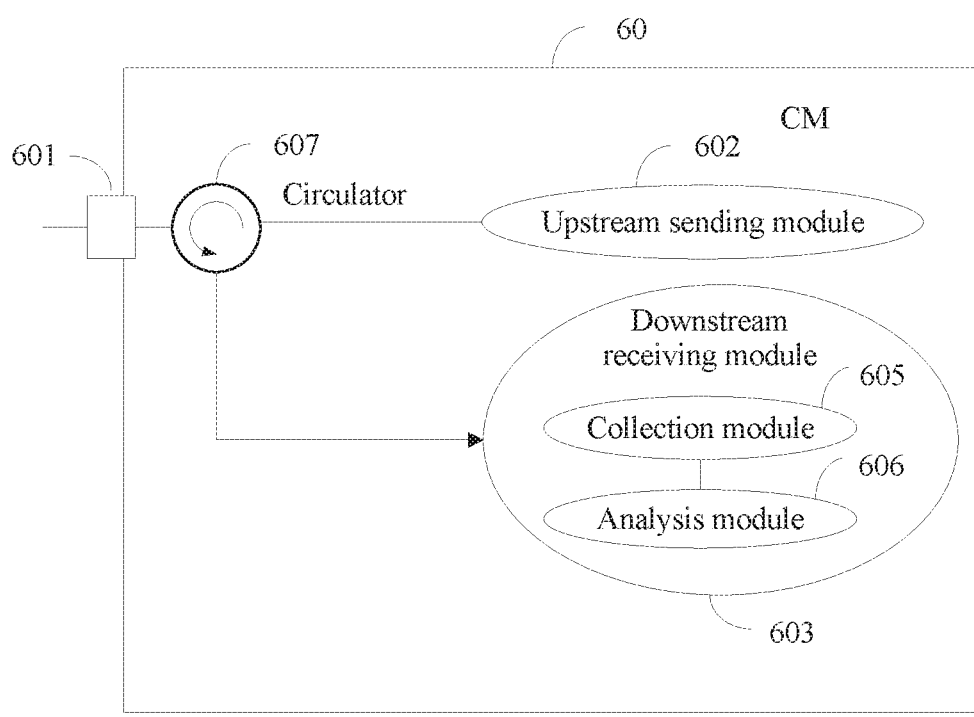
FIG. 6D is a schematic structural diagram of a fourth CM according to an embodiment of this application.

A fourth possible structure of a CM 60 is shown in FIG. 6D, and includes an interface 601, an upstream sending module 602, a downstream receiving module 603, a collection module 605, an analysis module 606, and a circulator 607. Three ports of the circulator 607 are respectively connected to the interface 601, the upstream sending module 602, and the downstream receiving module 603, a signal entered from the interface 601 arrives at the downstream receiving module 603 after passing through the circulator 607, and a signal sent by the upstream sending module 602 is sent from the interface 601 after passing through the circulator 607. The collection module 605 and the analysis module 606 may be located inside the downstream receiving module 603.

The structures of the CMs shown in FIG. 6A and FIG. 6B are mainly applied to a frequency division system, and the structures of the CMs shown in FIG. 6C and FIG. 6D are mainly applied to an intra-frequency duplex system.

Regardless of which structure is used by the CM 60, functions implemented by the modules such as the interface 601, the upstream sending module 602, the downstream receiving module 603, the collection module 605, and the analysis module 606 that are common to these four structures are similar.

Specifically, the upstream sending module 602 is configured to send an upstream signal to a CMTS by using the interface 601.

The downstream receiving module 603 is configured to receive a downstream signal from the CMTS by using the interface 601.

Upstream signals/an upstream signal from a downstream of the CM 60 enter/enters the CM 60 by using the interface 601.

The collection module 605 is configured to collect an upstream signal from a downstream of the CM 60, or collect an upstream signal from an upstream of the CM 60, or collect an upstream signal from a mixture of an upstream and a downstream of the CM 60.

The analysis module 606 is configured to detect whether the upstream signal has at least one of intrusion noise outside a carrier, white noise, non-linear distortion, pulse noise, intrusion noise on a carrier, and linear distortion.

In this application, the collection module 605 may collect the upstream signal in the following three collection manners:

In a first collection manner, the collection module 605 determines, based on a MAP message delivered by a CMTS, a time interval corresponding to an empty timeslot or a silent probe signal, and collects the upstream signal within the time interval corresponding to the empty timeslot or the silent probe signal. The MAP message is used to indicate a MAP timeslot occupied by each CM under control of the CMTS, and the empty timeslot or the silent probe signal indicates a MAP timeslot that is not occupied by any CM.

In a second collection manner, the collection module 605 determines, based on a MAP message delivered by a CMTS, an SID of any one of upstream devices of the CM 60 or downstream devices of the CM 60, and collects the upstream signal within a time interval corresponding to the SID of the any device.

Optionally, the collection module 605 may further set another condition, match the specified condition with the MAP message, and trigger collection of the upstream signal within a time interval corresponding to a timeslot that meets the condition. When a version of the MAP message is the Version 1 or the Version 5 used for non-probe frame allocation, the specified condition may be one or more of an upstream channel ID, an SID, an IUC, and an offset. When a version of the MAP message is the Version 5 used for probe frame allocation, the specified condition may be one or more of an upstream channel ID, an SID, an equalization (EQ), and a stagger.

In a third collection manner, the collection module 605 randomly collects the upstream signal. For example, when receiving a command from a network management system, the CM immediately triggers the collection module 605 to collect the upstream signal.

In this application, when analyzing a type of a fault in the upstream signal, the analysis module 606 may use different detection manners based on different fault types.

For example, when detecting whether the upstream signal has intrusion noise outside a carrier or white noise, the analysis module 606 may determine, based on each frequency component and frequency distribution range of the upstream signal through spectrum analysis, whether the upstream signal has the intrusion noise outside the carrier or the white noise.

Figure 7A:
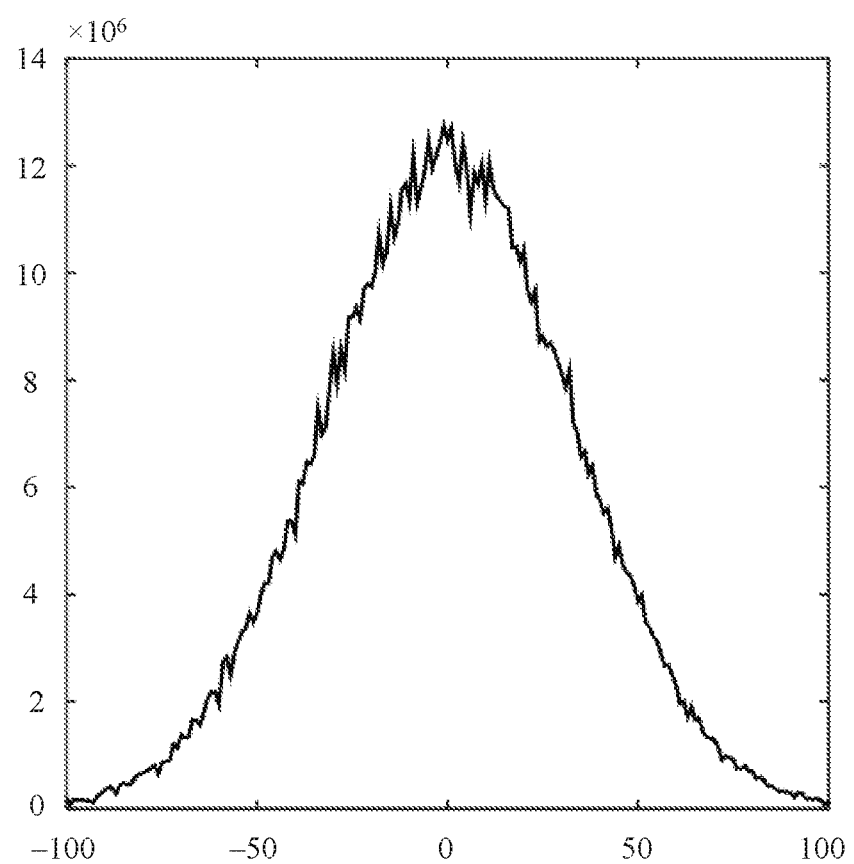
FIG. 7A is a histogram that is of a time-domain sampling value of an upstream signal and that conforms to Gaussian distribution according to an embodiment of this application.
Figure 7B:
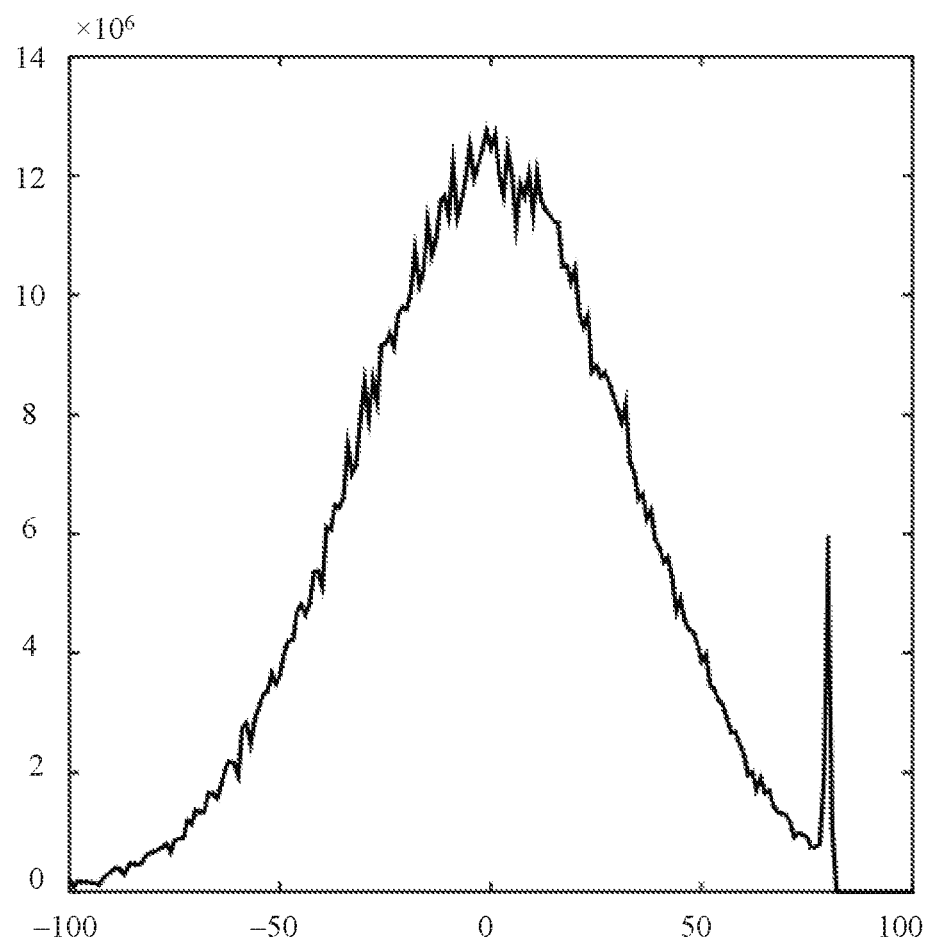
FIG. 7B is a histogram that is of a time-domain sampling value of an upstream signal and that does not conform to Gaussian distribution according to an embodiment of this application.

For example, when detecting whether the upstream signal has non-linear distortion, the analysis module 606 may draw a histogram based on a time-domain sampling value of the upstream signal. If the drawn histogram conforms to Gaussian distribution and is shown in FIG. 7A, the analysis module 606 may determine that the upstream signal does not have the non-linear distortion; or, if the drawn histogram does not conform to Gaussian distribution, the analysis module 606 may determine that the upstream signal has the non-linear distortion. The histogram that does not conform to the Gaussian distribution may be specifically represented as phenomena, such as histogram asymmetry, two peaks occurring in the histogram, and a spike occurring in the histogram. For example, a spike occurs at a tail of a histogram shown in FIG. 7B. Therefore, the histogram does not conform to the Gaussian distribution, and severity of a non-linear effect may be known by using a spike distribution status. A larger quantity of spikes and a more obvious spike indicate a severer non-linear effect of the upstream signal. Lateral axes in FIG. 7A and FIG. 7B represent a magnitude of the time-domain sampling value, and longitudinal axes in FIG. 7A and FIG. 7B represent a quantity of times or a probability corresponding to the magnitude of the time-domain sampling value on the horizontal coordinate.

For example, when the analysis module 606 detects whether the upstream signal has pulse noise, the collection module 605 may further include a band-pass filter. The upstream signal may first pass through the band-pass filter, and then be collected by the collection module 605. In this case, the band-pass filter is an analog band-pass filter. Alternatively, the upstream signal may be first collected by the collection module, and then input by the collection module into the band-pass filter for processing. In this case, the band-pass filter is a digital filter. The upstream signal passes through the band-pass filter and then is collected again. A center frequency of the band-pass filter is outside an upstream operating band of the CM 60. If energy in a passband of the band-pass filter reaches a specified threshold, the analysis module 606 may determine that the upstream signal has the pulse noise; or if energy in a passband of the band-pass filter does not reach the specified threshold, the analysis module 606 may determine that the upstream signal does not have the pulse noise.

The analysis module 606 may further collect statistics about pulse noise. For example, when energy in a passband of the band-pass filter reaches a specified threshold, the analysis module 606 may record that a pulse event starts. When the energy in the passband decreases from the specified threshold to below another specified threshold, the analysis module 606 may record that the pulse event ends. The analysis module 606 may separately record a start time and an end time that are of each pulse event, duration of each pulse event, average energy of each pulse event in duration, a quantity of times that a pulse event occurs per second within a period of time, and the like, so as to monitor the pulse noise.

For example, when the analysis module 606 detects whether the upstream signal has intrusion noise on a carrier, the collection module 605 may use the first collection manner. In other words, the collection module 605 collects the upstream signal within the time interval corresponding to the empty timeslot or the silent probe signal. If the collection module 605 collects the upstream signal, the analysis module 606 may further determine, through spectrum analysis, whether the upstream signal has the intrusion noise on the carrier; or if the collection module 605 does not collect the upstream signal, the analysis module 606 may determine that the upstream signal does not have the intrusion noise on the carrier.

For example, when the analysis module 606 detects whether the upstream signal has linear distortion, the collection module 605 may use the second collection manner. In other words, the collection module 605 collects the upstream signal within the time interval corresponding to the SID of the any device. In this case, the upstream signal collected by the collection module 605 is an upstream signal of a designated CM. The analysis module 606 analyzes the upstream signal collected by the collection module 605, for example, performs spectrum analysis, to determine whether the upstream signal has the linear distortion.

Optionally, when the collection module 605 uses the second collection manner, the analysis module 606 may be further configured to monitor signal quality of a designated device. For example, the analysis module 606 may demodulate the upstream signal to obtain a signal quality parameter of the upstream signal, where the signal quality parameter may include a parameter, such as an equalization coefficient, a modulation error ratio (MER), and a level, and/or the analysis module 606 may further obtain a test signal of the any device, and compare the test signal with the upstream signal collected by the collection module 605 to obtain a transmission characteristic of a line between the CM and the any device, where the test signal is an initial state signal obtained when the upstream signal is sent from the any device.

This application further provides a direction-selective apparatus, and the direction-selective apparatus is an improvement on a conventional tap. In the conventional tap, both an upstream signal from an upstream (namely, an input port side of the tap) and an upstream signal from a downstream (namely, an output port side of the tap) flow into a branch port. The direction-selective apparatus provided in this application can allow only an upstream signal in one direction to flow into a branch port of the direction-selective apparatus, for example, allow only the upstream signal from the upstream (namely, the input port side of the direction-selective apparatus) to flow into the branch port of the direction-selective apparatus, or allow only the upstream signal from the downstream (namely, the output port side of the direction-selective apparatus) to flow into the branch port of the direction-selective apparatus.

Figure 8:
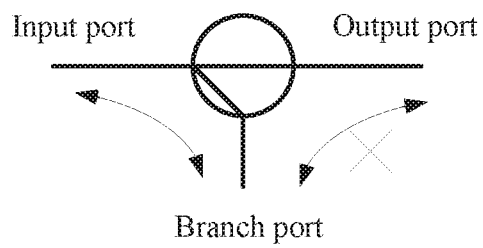
FIG. 8 is a schematic structural diagram of a direction-selective apparatus implemented by adjusting isolation according to an embodiment of this application.

The direction-selective apparatus may be implemented by adjusting isolation of the conventional tap, to allow only the upstream signal from the upstream to flow into the branch port of the direction-selective apparatus. A possible structure of the direction-selective apparatus is shown in FIG. 8, and the direction-selective apparatus includes an input port, an output port, and a branch port. Isolation between the output port and the branch port meets the following condition: A strength ratio of the upstream signal flowing from the output port to the branch port to the upstream signal flowing from the input port to the branch port is lower than a specified threshold.

For example, in the conventional tap, isolation between the output port and the branch port is usually approximately 30 dB only, and isolation between the input port and the branch port is usually 20 dB. It indicates that the upstream signal flowing from the output port to the branch port is 10% of the upstream signal flowing from the input port to the branch port. Because this ratio is relatively high, it can be considered that both the upstream signal entered from the input port and the upstream signal entered from the output port flow into the branch port in the conventional tap. In this application, the isolation between the output port and the branch port increases in the conventional tap, for example, increases to 50 dB. In this way, the upstream signal flowing from the output port to the branch port is 0.1% of the upstream signal flowing from the input port to the branch port, so that the upstream signal entered from the output port side is negligible, to allow only the upstream signal entered from the output port of the direction-selective apparatus to flow into the branch port of the direction-selective apparatus.

In addition, the direction-selective apparatus may be implemented by using a circulator or an isolator, to allow only the upstream signal from the downstream to flow into the branch port of the direction-selective apparatus.

Figure 9A:
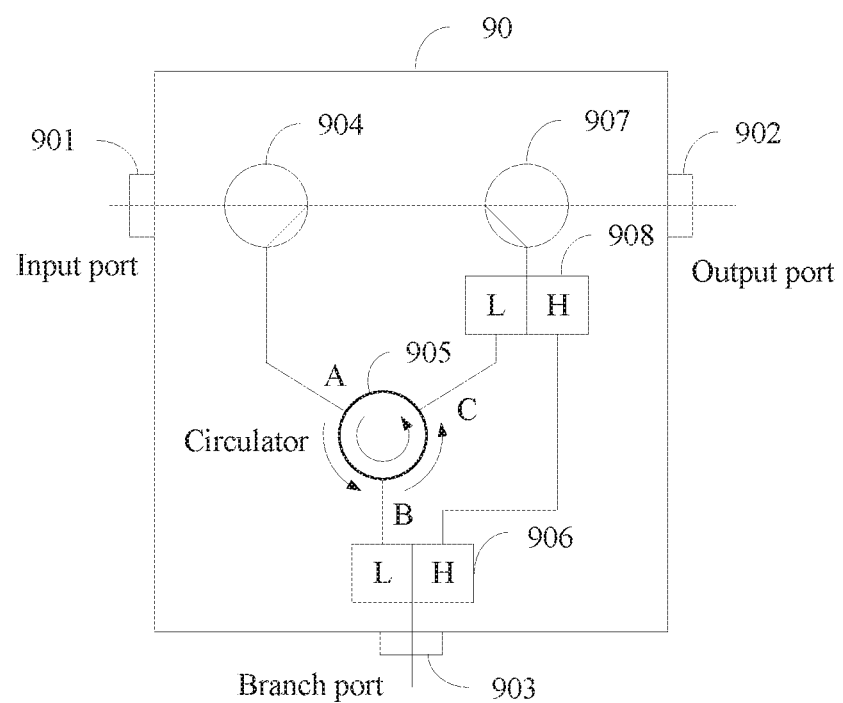
FIG. 9A is a schematic structural diagram of a direction-selective apparatus implemented by using a circulator according to an embodiment of this application.

The circulator generally has three ports, and a signal that enters the circulator can be transmitted only in a specific direction. In FIG. 9A, a signal that is input from a port A of a circulator 905 can arrive at only a port B but cannot arrive at a port C, a signal that is input from the port B can arrive at only the port C, and a signal that is input from the port C can arrive at only the port A, to form a ring transmission characteristic of the port A→the port B→the port C→the port A.

Figure 11A:
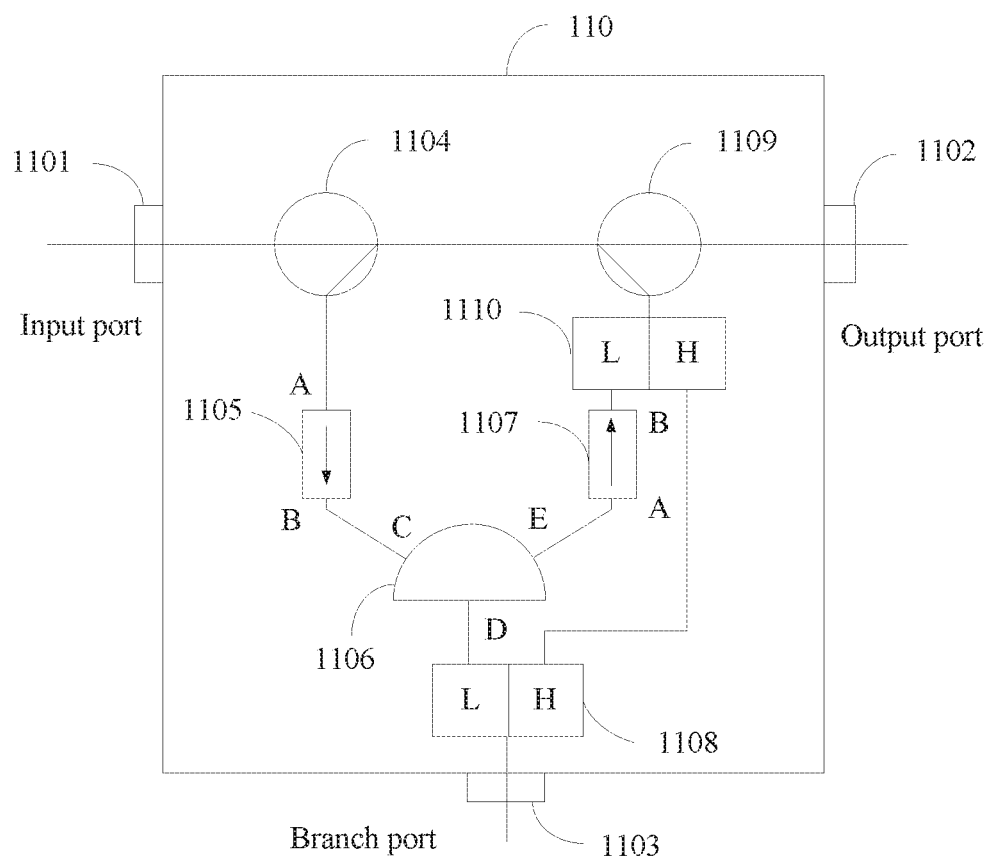
FIG. 11A is a schematic structural diagram of a direction-selective apparatus implemented by using an isolator according to an embodiment of this application.
Figure 11B:
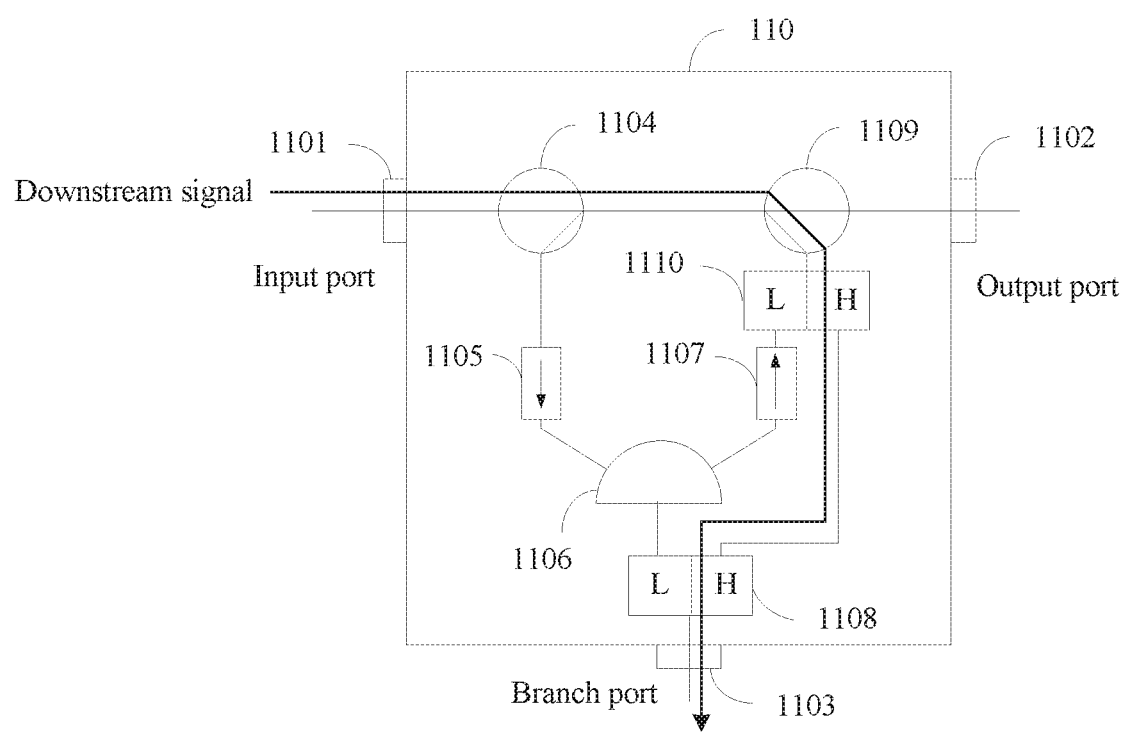
FIG. 11B is a schematic diagram of a transmission path of a downstream signal entered from an input port in the direction-selective apparatus shown in FIG. 11A.

The isolator generally has two ports, and a signal that enters the isolator can enter the other direction only from one direction. In FIG. 11A, a signal that is input from a port A of an isolator 1105 can arrive at a port B, and a signal that is input from the port B cannot be transmitted to the port A, to form a unidirectional transmission characteristic of the port A→the port B.

The direction-selective apparatus may have a plurality of structures. This application lists only four structures to describe how the direction-selective apparatus allows only the upstream signal from the downstream to flow into the branch port of the direction-selective apparatus.

As shown in FIG. 9A, FIG. 9A is a schematic structural diagram of a direction-selective apparatus 90 implemented by using a circulator. The apparatus 90 allows only an upstream signal from a downstream to flow into a branch port of the apparatus 90.

The apparatus 90 includes an input port 901, an output port 902, a branch port 903, a first tap 904, a circulator 905, a first duplexer 906, a second tap 907, and a second duplexer 908.

It should be noted that the apparatus 90 generally includes one input port 901, one output port 902, and at least one branch port 903. For brevity, only one branch port 903 is drawn in FIG. 9A in this application.

The apparatus 90 meets the following four conditions through mutual cooperation of the foregoing modules.

Figure 9B:
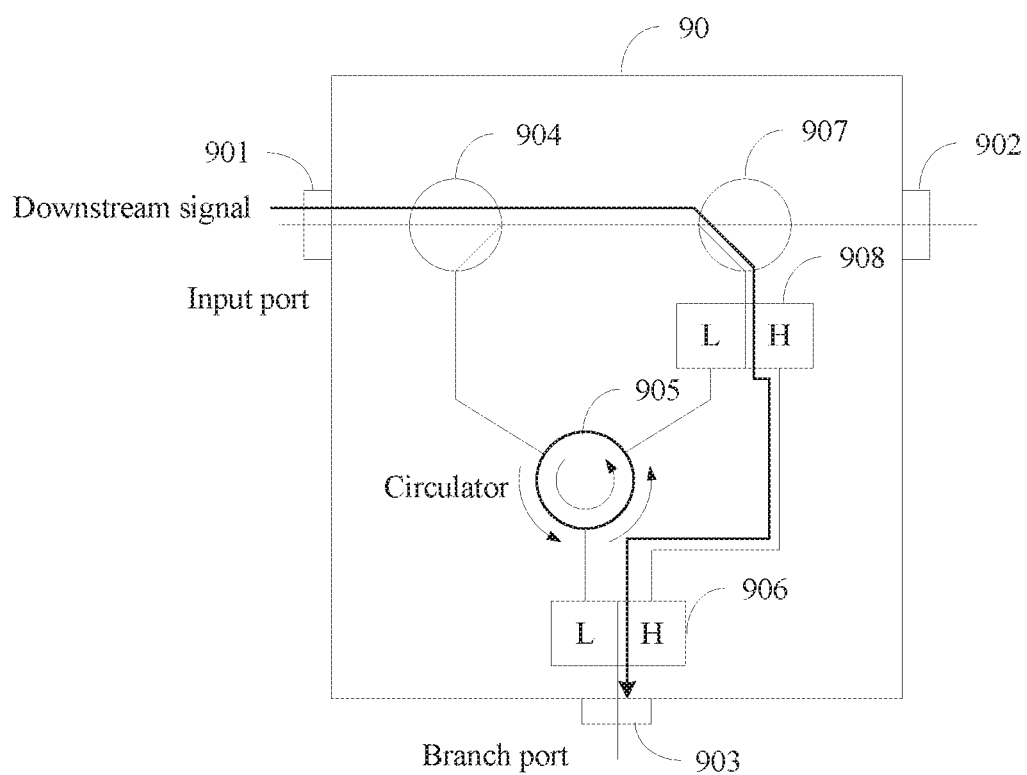
FIG. 9B is a schematic diagram of a transmission path of a downstream signal entered from an input port in the direction-selective apparatus shown in FIG. 9A.

Condition 1: A downstream signal entered from the input port 901 may arrive at the branch port 903, and a transmission path of the downstream signal is shown in FIG. 9B.

Specifically, the input port 901 is configured to send, to the second duplexer 908 by using a branch link of the second tap 907, the downstream signal entered from the input port 901.

The second duplexer 908 is configured to send the downstream signal to a high-pass filter of the first duplexer 906 by using a high-pass filter of the second duplexer 908.

The high-pass filter of the first duplexer 906 is configured to send the downstream signal to the branch port 903.

Figure 9C:
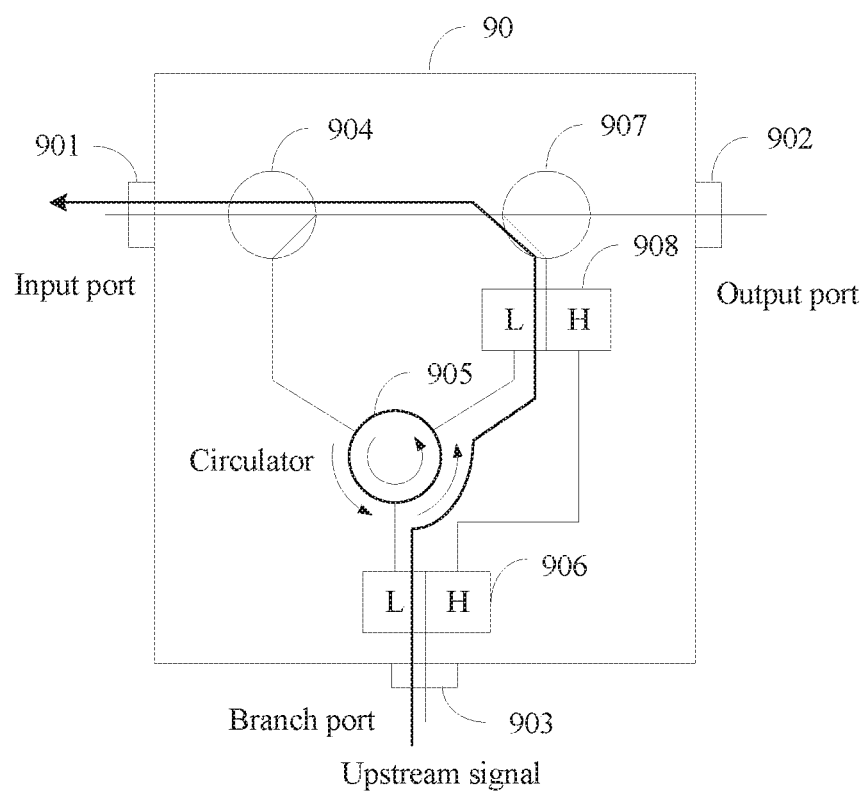
FIG. 9C is a schematic diagram of a transmission path of an upstream signal entered from a branch port in the direction-selective apparatus shown in FIG. 9A.

Condition 2: An upstream signal entered from the branch port 903 may arrive at the input port 901, and a transmission path of the upstream signal is shown in FIG. 9C.

Specifically, the branch port 903 is configured to send, to the first duplexer 906, the upstream signal entered from the branch port 903.

The first duplexer 906 is configured to send the upstream signal to the circulator 905 by using a low-pass filter of the first duplexer 906.

The circulator 905 is configured to unidirectionally transmit the upstream signal to a low-pass filter of the second duplexer 908.

The low-pass filter of the second duplexer 908 is configured to send the upstream signal to the input port 901 by using a branch link of the second tap 907.

Figure 9D:
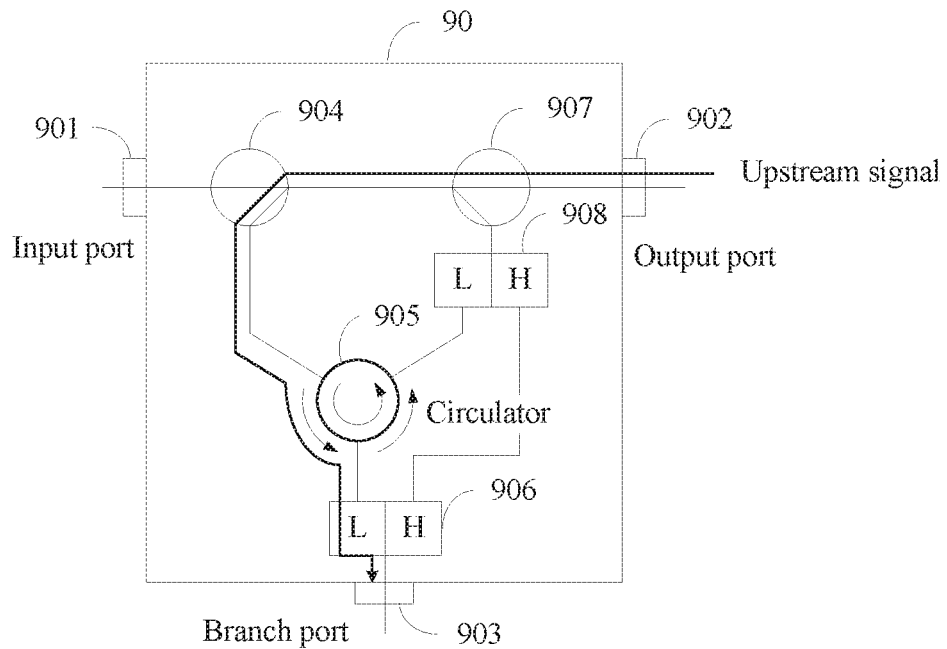
FIG. 9D is a schematic diagram of a transmission path of an upstream signal entered from an output port in the direction-selective apparatus shown in FIG. 9A.

Condition 3: An upstream signal entered from the output port 902 may arrive at the branch port 903, and a transmission path of the upstream signal is shown in FIG. 9D.

Specifically, the output port 902 is configured to send the upstream signal to the circulator 905 by using a branch link of the first tap 904.

The circulator 905 is configured to unidirectionally transmit the upstream signal to a low-pass filter of the first duplexer 906.

The low-pass filter of the first duplexer 906 is configured to send the upstream signal to the branch port 903.

Figure 9E:
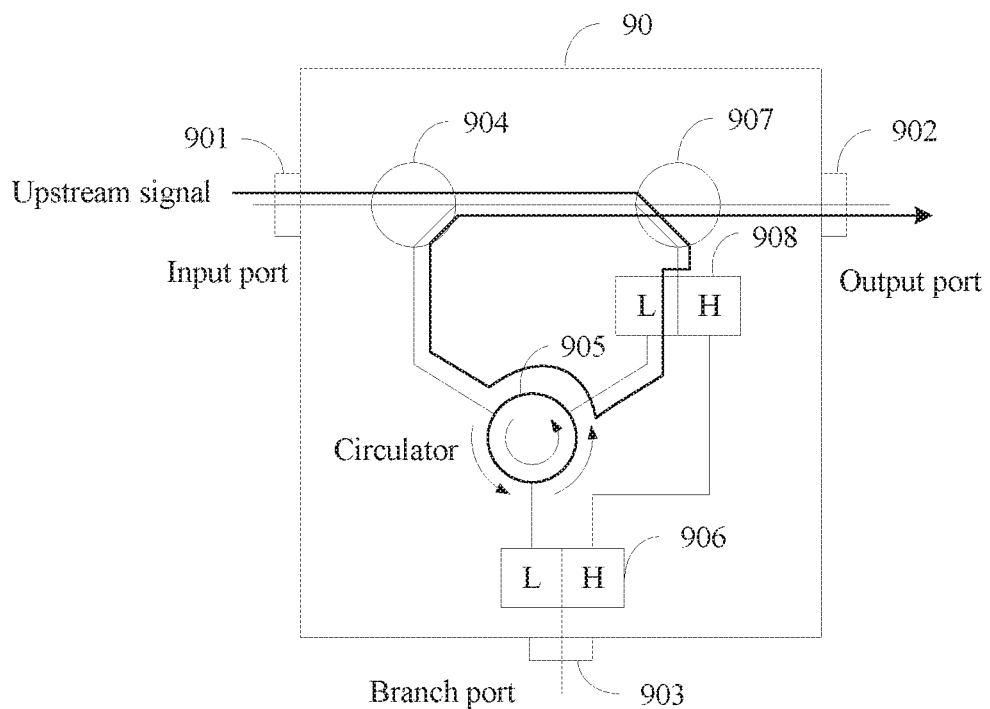
FIG. 9E is a schematic diagram of a transmission path of an upstream signal entered from an input port in the direction-selective apparatus shown in FIG. 9A.

Condition 4: An upstream signal entered from the input port 901 cannot arrive at the branch port 903, and a transmission path of the upstream signal is shown in FIG. 9E.

Specifically, the input port 901 is configured to send the upstream signal to the second duplexer 908 by using a branch link of the second tap 907.

The second duplexer 908 is configured to send the upstream signal to the circulator 905 by using a low-pass filter of the second duplexer 908.

The circulator 905 is configured to unidirectionally transmit the upstream signal to the first tap 904, and the first tap 904 sends the upstream signal to the output port 902 by using a branch link of the first tap 904 for sending.

The condition 1 and the condition 2 are intended to ensure, when the branch port of the direction-selective apparatus is connected to a CM, that a service of the CM is normally performed. The conditions 3 and the condition 4 are intended to implement direction selectivity of the direction-selective apparatus.

Figure 10A:
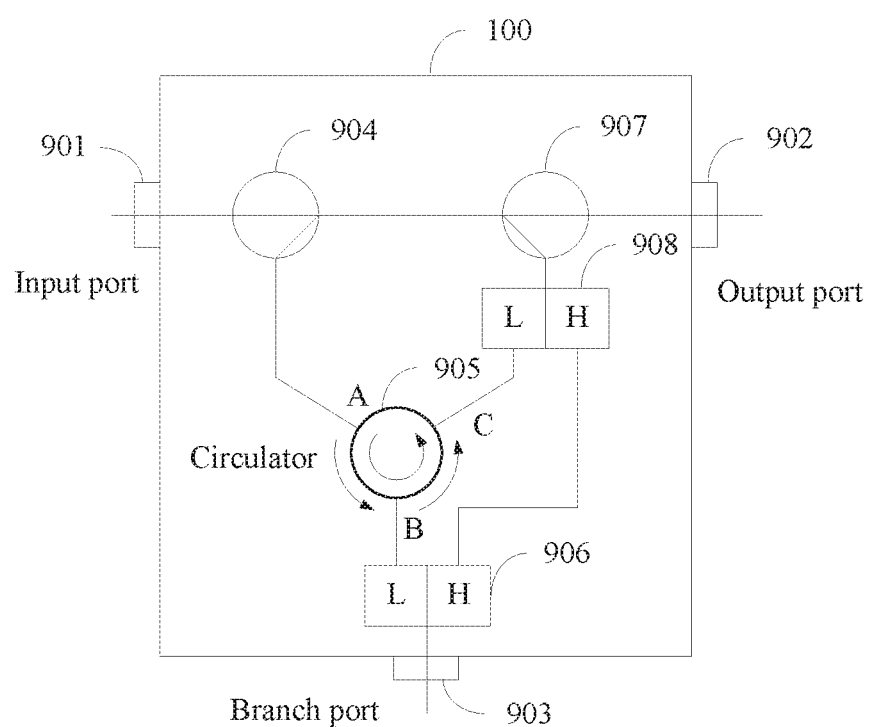
FIG. 10A is a schematic structural diagram of another direction-selective apparatus implemented by using a circulator according to an embodiment of this application.

Optionally, locations of the first tap 904 and the second tap 907 are interchangeable, to obtain a schematic structural diagram of another direction-selective apparatus 100 that is implemented by using a circulator and that is shown in FIG. 10A.

Figure 10B:
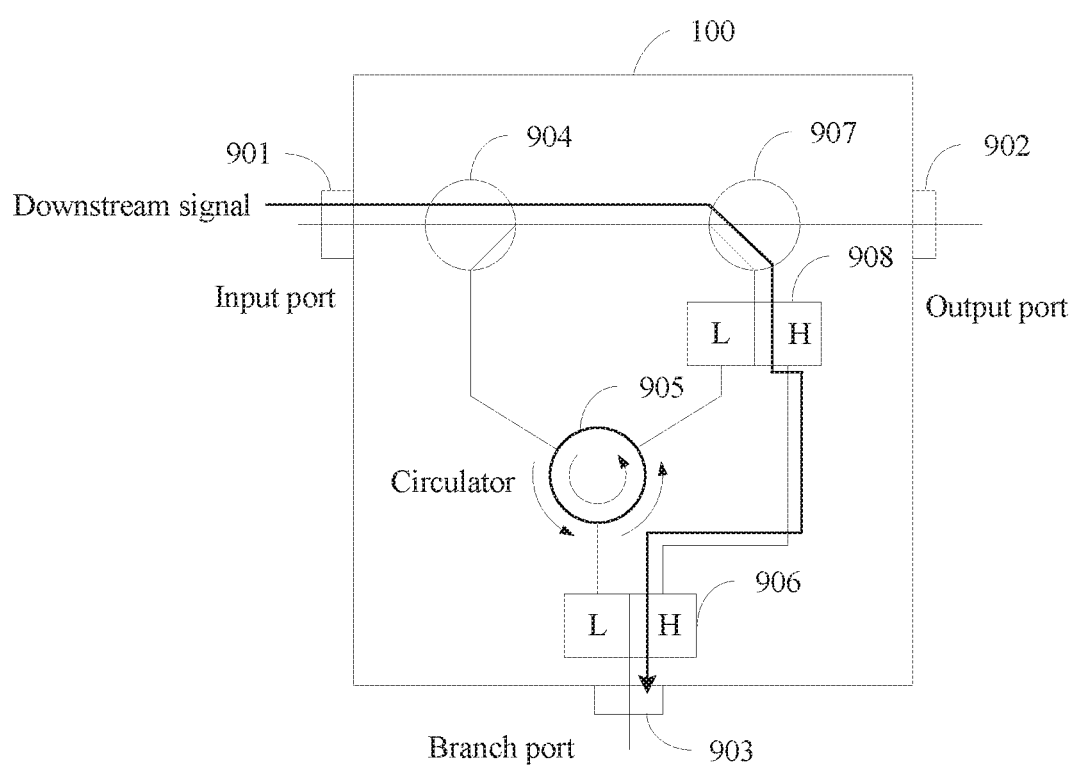
FIG. 10B is a schematic diagram of a transmission path of a downstream signal entered from an input port in the direction-selective apparatus shown in FIG. 10A.
Figure 10C:
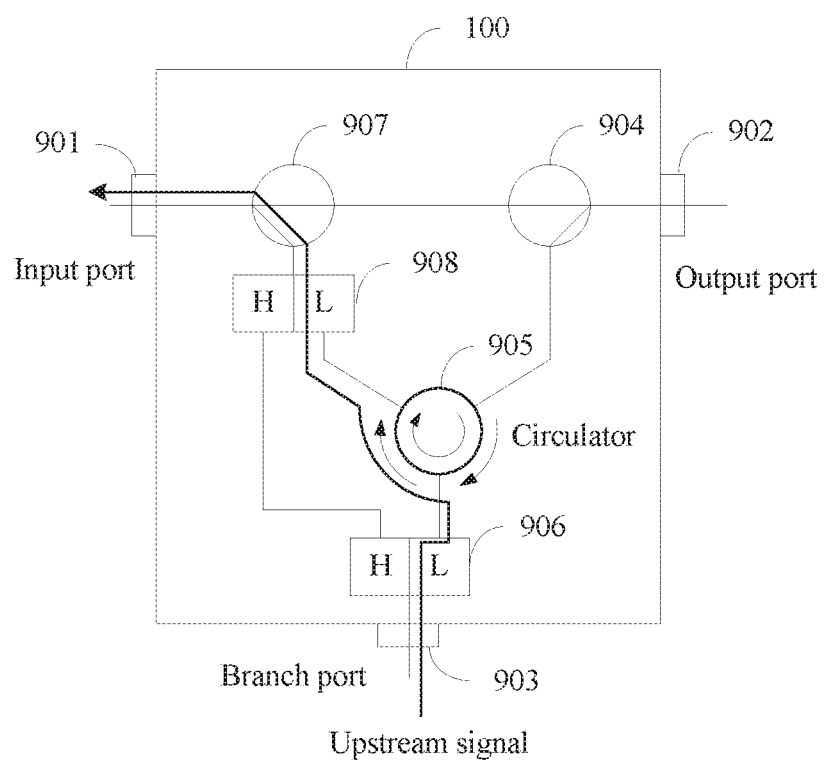
FIG. 10C is a schematic diagram of a transmission path of an upstream signal entered from a branch port in the direction-selective apparatus shown in FIG. 10A.
Figure 10D:
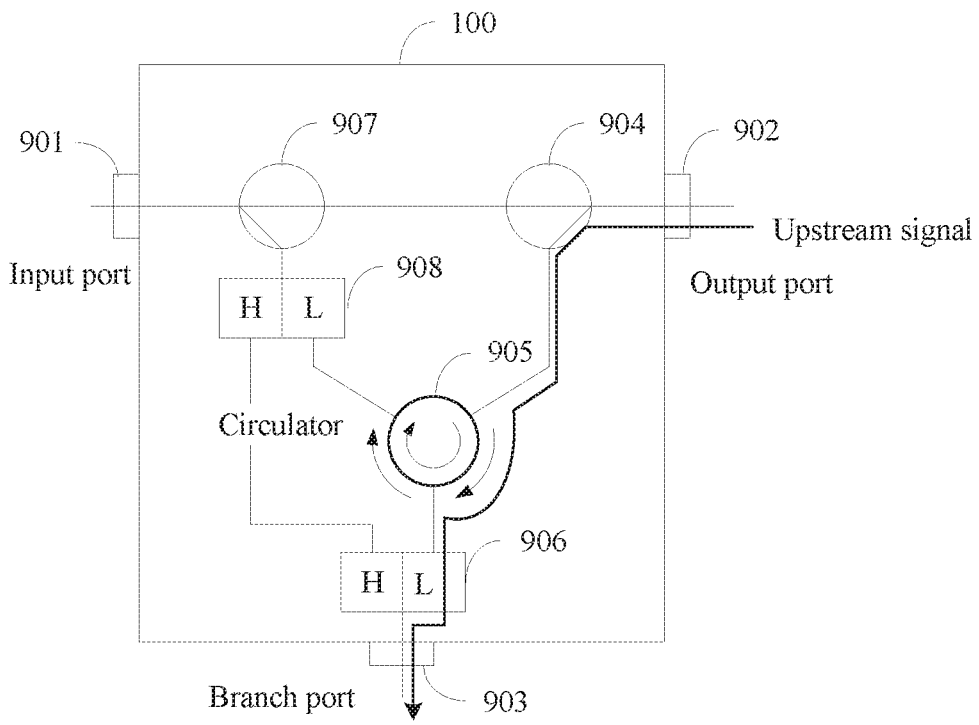
FIG. 10D is a schematic diagram of a transmission path of an upstream signal entered from an output port in the direction-selective apparatus shown in FIG. 10A.
Figure 10E:
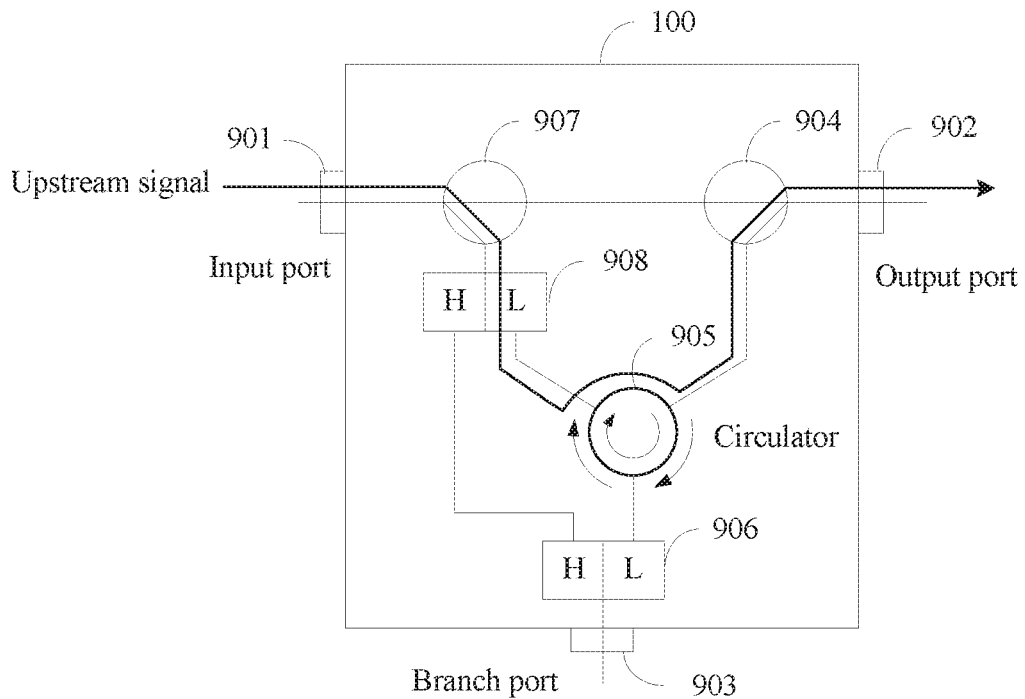
FIG. 10E is a schematic diagram of a transmission path of an upstream signal entered from an input port in the direction-selective apparatus shown in FIG. 10A.

The apparatus 100 also meets the four conditions of the apparatus 90. In other words, a downstream signal entered from the input port 901 may arrive at the branch port 903, and a transmission path of the downstream signal is shown in FIG. 10B; an upstream signal entered from the branch port 903 may arrive at the input port 901, and a transmission path of the upstream signal is shown in FIG. 10C; an upstream signal entered from the output port 902 may arrive at the branch port 903, and a transmission path of the upstream signal is shown in FIG. 10D; and an upstream signal entered from the input port 901 cannot arrive at the branch port 903, and a transmission path of the upstream signal is shown in FIG. 10E.

As shown in FIG. 11A, FIG. 11A is a schematic structural diagram of a direction-selective apparatus 110 implemented by using an isolator. The apparatus 110 allows only an upstream signal from a downstream to flow into a branch port of the apparatus 110.

The apparatus 110 includes an input port 1101, an output port 1102, a branch port 1103, a first tap 1104, a first isolator 1105, a distributor 1106, a second isolator 1107, a first duplexer 1108, a second tap 1109, and a second duplexer 1110.

The distributor generally has three ports, including one master port and two branch ports. A signal entered from the master port of the distributor may arrive at the two branch ports. However, a signal entered from a branch port of the distributor can be transmitted to only the master port but cannot be transmitted to the other branch port. In FIG. 11A, the distributor 1106 includes a port C, a port D, and a port E. The port C and the port E are branch ports, and the port D is a master port. The port C and the port D are interworked, and the port D and the port E are also interworked. However, the port C and the port E are not interworked.

It should be noted that the apparatus 110 generally includes one input port 1101, one output port 1102, and at least one branch port 1103. For brevity, only one branch port 1103 is drawn in FIG. 11A in this application.

The apparatus 110 meets the following four conditions through mutual cooperation of the foregoing modules.

Condition 1: A downstream signal entered from the input port 1101 may arrive at the branch port 1103, and a transmission path of the downstream signal is shown in FIG. 1B.

Specifically, the input port 1101 is configured to send, to the second duplexer 1110 by using a branch link of the second tap 1109, the downstream signal entered from the input port 1101.

The second duplexer 1110 is configured to send the downstream signal to a high-pass filter of the first duplexer 1108 by using a high-pass filter of the second duplexer 1110.

The high-pass filter of the first duplexer 1108 is configured to send the downstream signal to the branch port 1103.

Figure 11C:
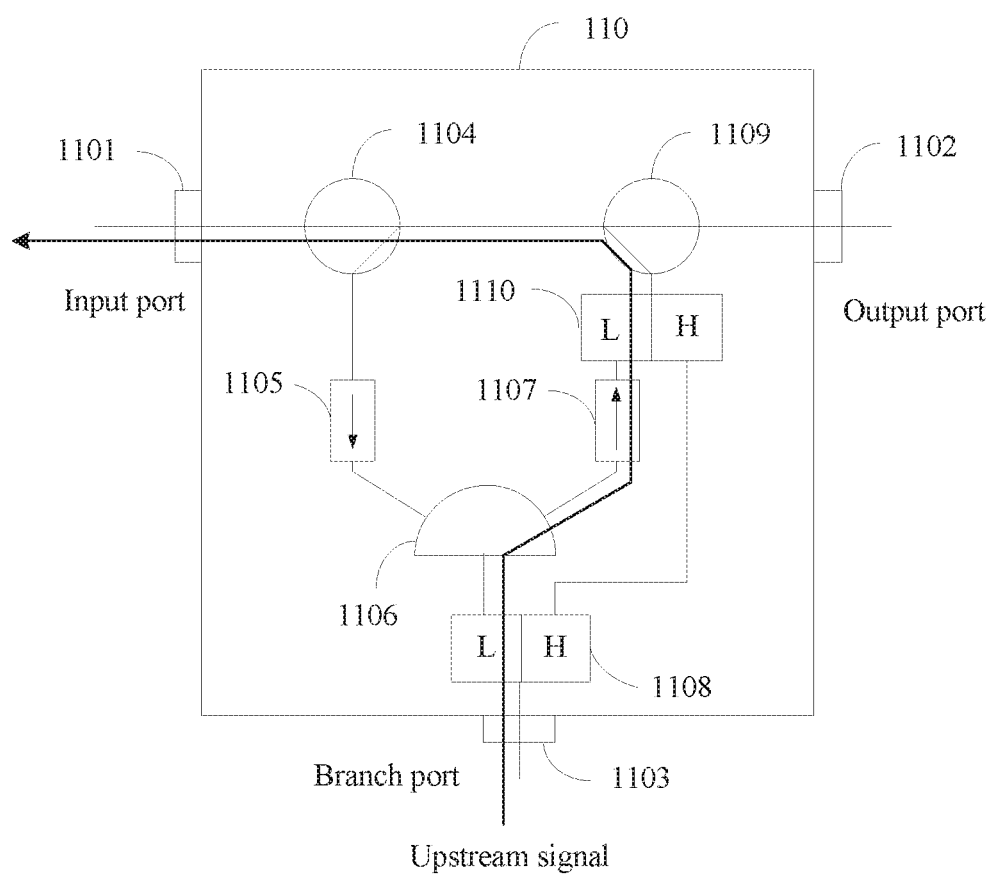
FIG. 11C is a schematic diagram of a transmission path of an upstream signal entered from a branch port in the direction-selective apparatus shown in FIG. 11A.

Condition 2: An upstream signal entered from the branch port 1103 may arrive at the input port 1101, and a transmission path of the upstream signal is shown in FIG. 11C.

Specifically, the branch port 1103 is configured to send, to the first duplexer 1108, the upstream signal entered from the branch port 1103.

The first duplexer 1108 is configured to send the upstream signal to the distributor 1106 by using a low-pass filter of the first duplexer 1108.

The distributor 1106 is configured to transmit the upstream signal to the second isolator 1107.

Due to a unidirectional transmission characteristic of the first isolator 1105, the upstream signal is prevented by the first isolator 1105 when arriving, from the port D of the distributor 1106, at the first isolator 1105 to which the port C is connected. Therefore, the upstream signal can arrive, only from the port D of the distributor 1106, at the second isolator 1107 to which the port E is connected.

The second isolator 1107 is configured to unidirectionally transmit the upstream signal to a low-pass filter of the second duplexer 1110.

The low-pass filter of the second duplexer 1110 is configured to send the upstream signal to the input port 1101 by using a branch link of the second tap 1109.

Figure 11D:
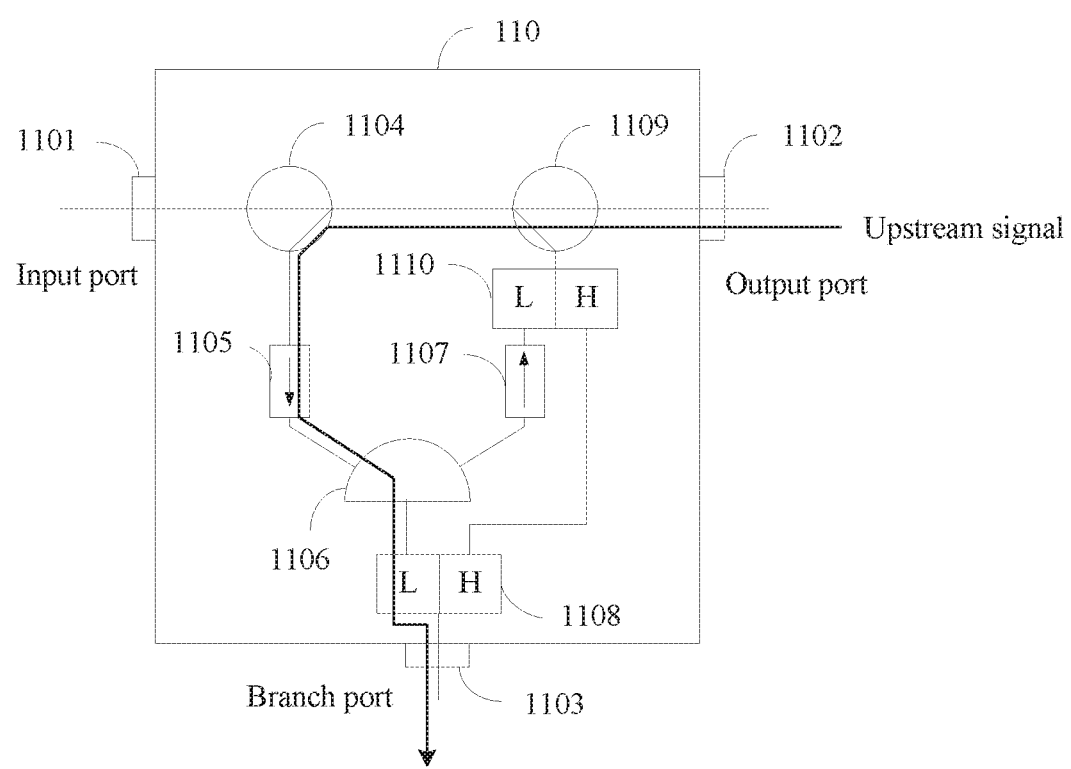
FIG. 11D is a schematic diagram of a transmission path of an upstream signal entered from an output port in the direction-selective apparatus shown in FIG. 11A.

Condition 3: An upstream signal entered from the output port 1102 may arrive at the branch port 1103, and a transmission path of the upstream signal is shown in FIG. 11D.

Specifically, the output port 1102 is configured to send, to the first isolator 1105 by using a branch link of the first tap 1104, the upstream signal entered from the output port 1102.

The first isolator 1105 is configured to unidirectionally transmit the upstream signal to the distributor 1106.

The distributor 1106 is configured to transmit the upstream signal to a low-pass filter of the first duplexer 1108.

The low-pass filter of the first duplexer 1108 is configured to send the upstream signal to the branch port 1103.

Figure 11E:
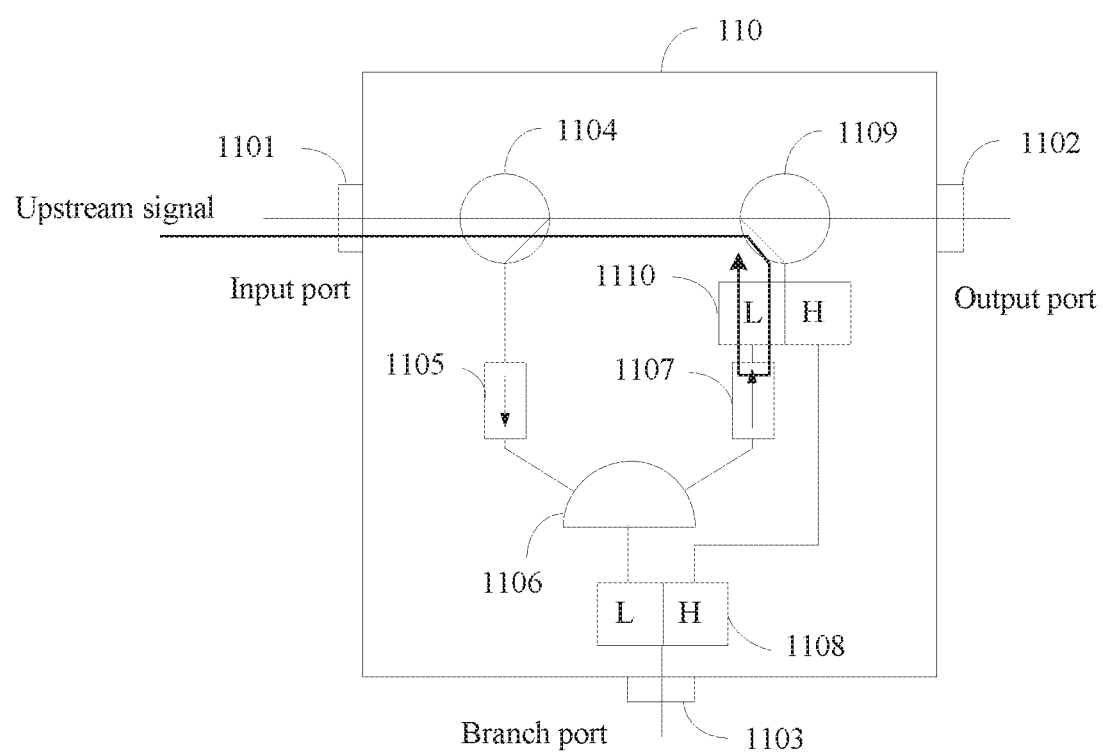
FIG. 11E is a schematic diagram of a transmission path of an upstream signal entered from an input port in the direction-selective apparatus shown in FIG. 11A.

Condition 4: An upstream signal entered from the input port 1101 cannot arrive at the branch port 1103, and a transmission path of the upstream signal is shown in FIG. 11E.

Specifically, the input port 1101 is configured to send, to the second duplexer 1110 by using a branch link of the second tap 1109, the upstream signal entered from the input port 1101.

The second duplexer 1110 is configured to send the upstream signal to the second isolator 1107 by using a low-pass filter of the second duplexer 1110.

The second isolator 1107 is configured to prevent the upstream signal from entering the distributor 1106.

Figure 12A:
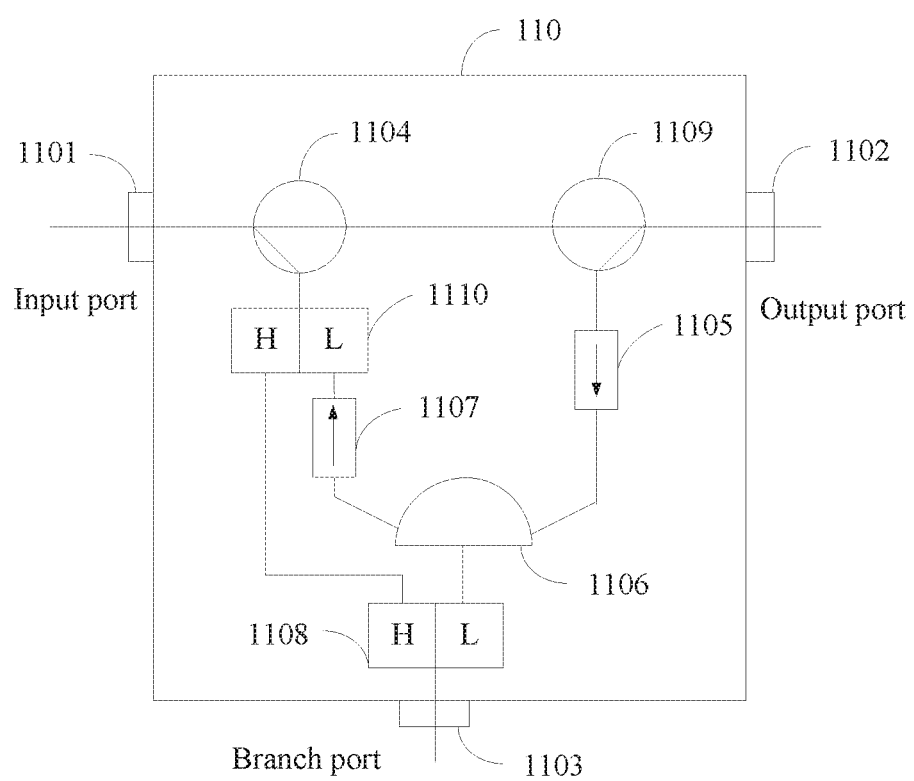
FIG. 12A is a schematic structural diagram of a direction-selective apparatus implemented by using an isolator according to an embodiment of this application.

Optionally, locations of the first tap 1104 and the second tap 1109 are interchangeable, to obtain a schematic structural diagram of another direction-selective apparatus 120 that is implemented by using an isolator and that is shown in FIG. 12A.

Figure 12B:
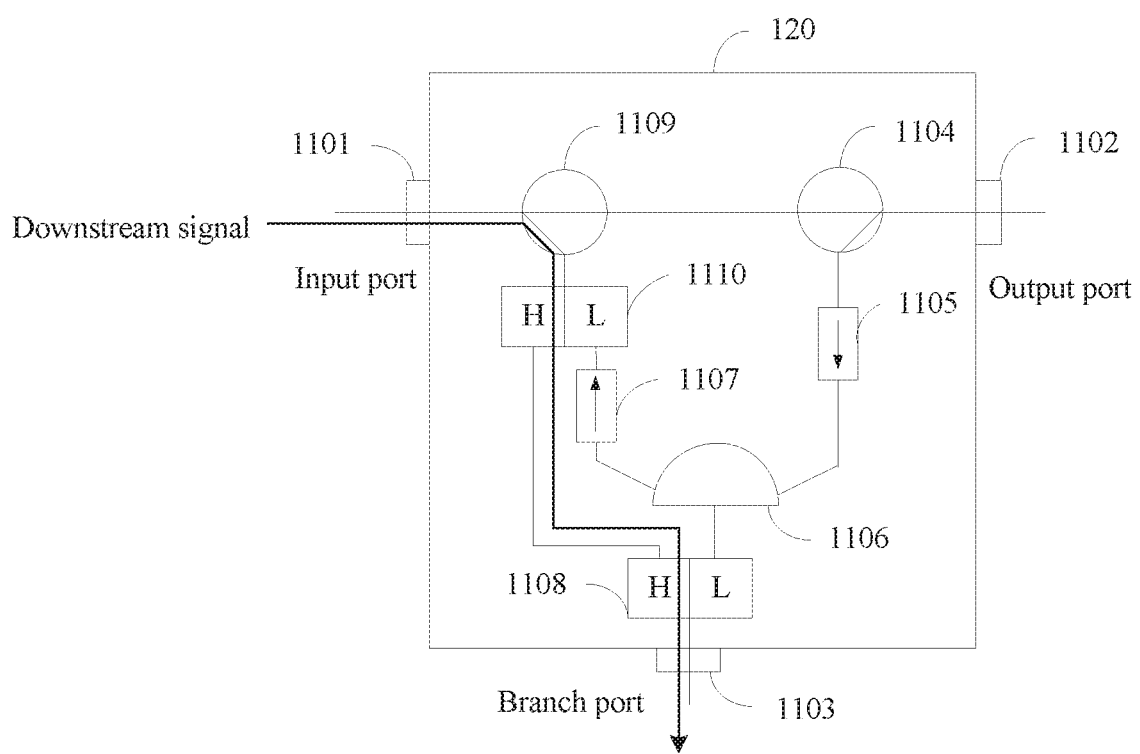
FIG. 12B is a schematic diagram of a transmission path of a downstream signal entered from an input port in the direction-selective apparatus shown in FIG. 12A.
Figure 12C:
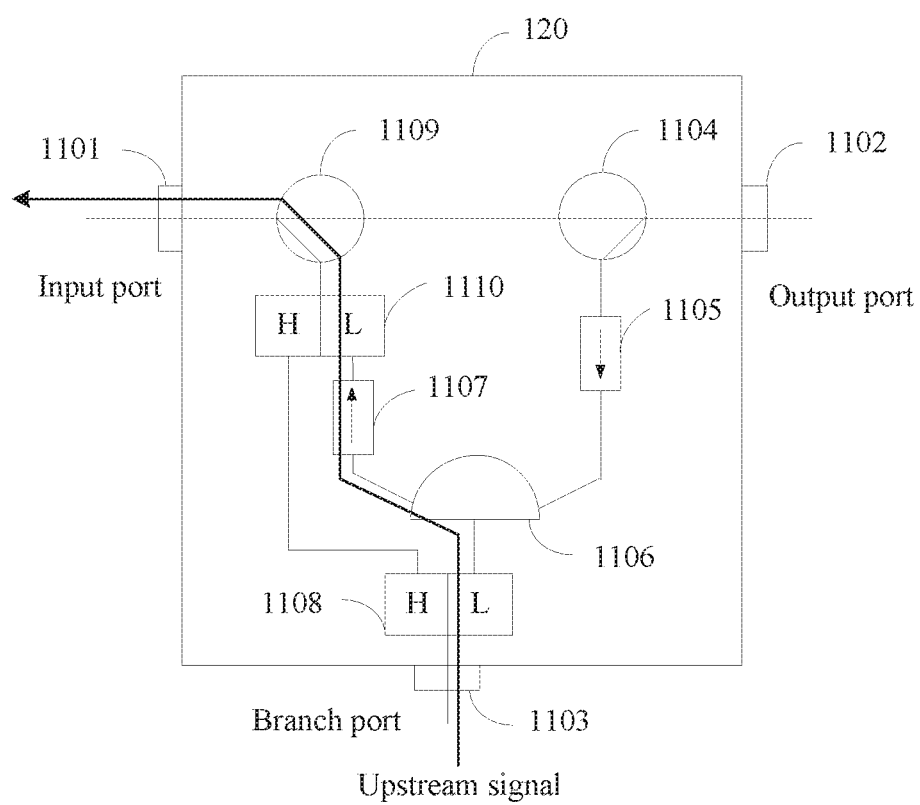
FIG. 12C is a schematic diagram of a transmission path of an upstream signal entered from a branch port in the direction-selective apparatus shown in FIG. 12A.
Figure 12D:
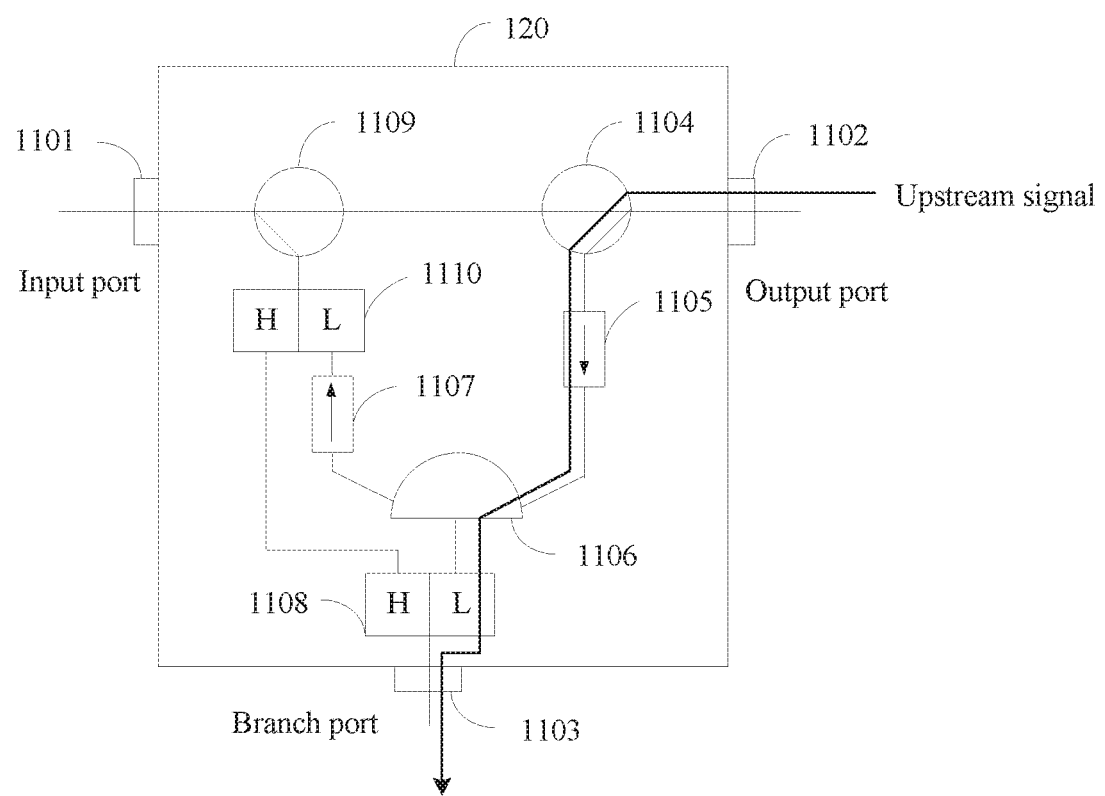
FIG. 12D is a schematic diagram of a transmission path of an upstream signal entered from an output port in the direction-selective apparatus shown in FIG. 12A.
Figure 12E:
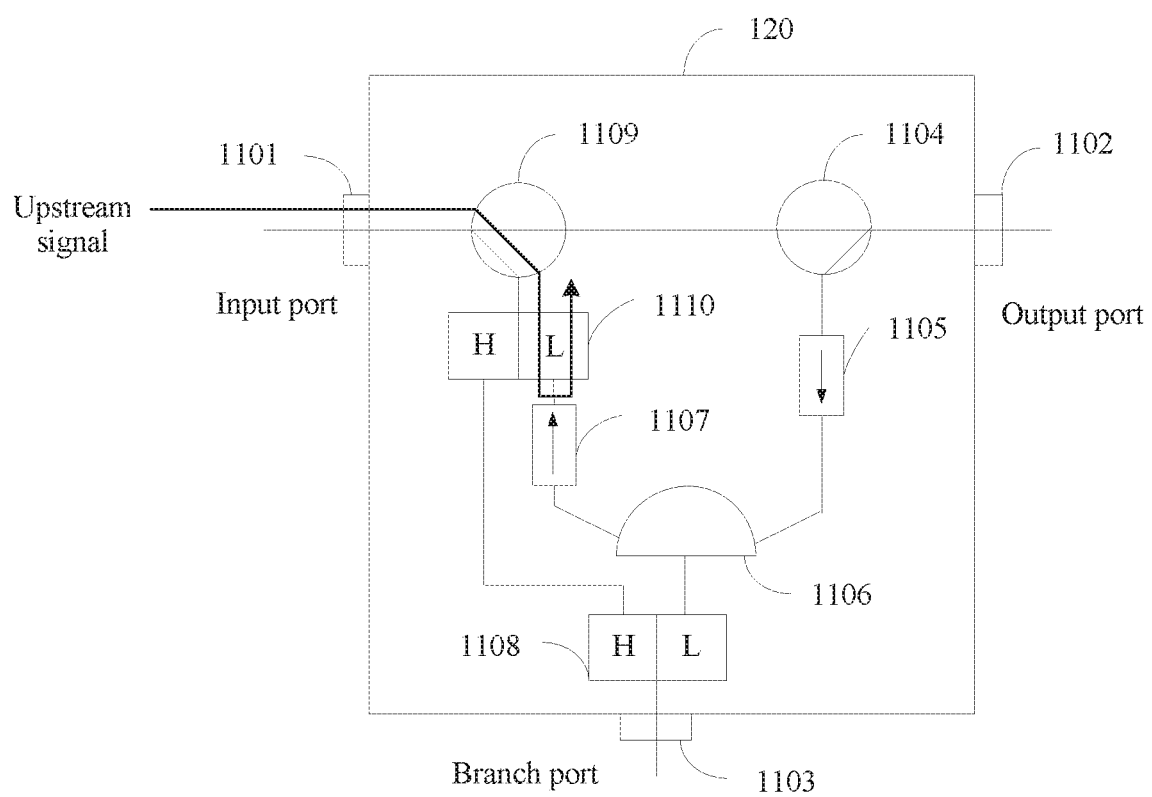
FIG. 12E is a schematic diagram of a transmission path of an upstream signal entered from an input port in the direction-selective apparatus shown in FIG. 12A.

The apparatus 120 also meets the four conditions of the apparatus 110. In other words, a downstream signal entered from the input port 1101 may arrive at the branch port 1103, and a transmission path of the downstream signal is shown in FIG. 12B; an upstream signal entered from the branch port 1103 may arrive at the input port 1101, and a transmission path of the upstream signal is shown in FIG. 12C: an upstream signal entered from the output port 1102 may arrive at the branch port 1103, and a transmission path of the upstream signal is shown in FIG. 12D; and an upstream signal entered from the input port 1101 cannot arrive at the branch port 1103, and a transmission path of the upstream signal is shown in FIG. 12E.

It should be noted that the CM that has an upstream signal collection and analysis function and the direction-selective apparatus may be separately implemented, or may be implemented in cooperation with another technical means.

If the CM that has the upstream signal collection and analysis function and the direction-selective apparatus are implemented together, this application provides an integral part of an HFC network fault locating system.

The HFC network fault locating system may include at least one of the foregoing CMs, and further include at least one of the foregoing direction-selective apparatuses.

The direction-selective apparatus includes a branch port, an input port, and an output port, the CM is connected to the branch port of the direction-selective apparatus, the input port of the direction-selective apparatus is connected to an upstream of the CM, and the output port of the direction-selective apparatus is connected to a downstream of the CM.

The direction-selective apparatus is configured to: transmit, to the CM by using the branch port of the direction-selective apparatus, a first upstream signal that is from the downstream of the CM and that is entered from the output port of the direction-selective apparatus, and isolate a second upstream signal that is from the downstream of the CM and that is entered from the input port of the direction-selective apparatus, so that the second upstream signal cannot arrive at the CM. Alternatively, the direction-selective apparatus is configured to: transmit a second upstream signal to the CM by using the branch port, and isolate a first upstream signal, so that the first upstream signal cannot arrive at the CM.

If the direction-selective apparatus chooses to transmit the first upstream signal to the CM and isolate the second upstream signal, when the CM detects that the first upstream signal has at least one of intrusion noise outside a carrier, white noise, non-linear distortion, pulse noise, intrusion noise on a carrier, and linear distortion, the CM may determine that the at least one of the intrusion noise outside the carrier, the white noise, the non-linear distortion, the pulse noise, the intrusion noise on the carrier, and the linear distortion occurs on an output port side of the direction-selective apparatus.

If the direction-selective apparatus chooses to transmit the second upstream signal to the CM and isolate the first upstream signal, when the CM detects that the second upstream signal has at least one of intrusion noise outside a carrier, white noise, non-linear distortion, pulse noise, intrusion noise on a carrier, and linear distortion, the CM is configured to determine that the at least one of the intrusion noise outside the carrier, the white noise, the non-linear distortion, the pulse noise, the intrusion noise on the carrier, and the linear distortion occurs on an input port side of the direction-selective apparatus.

Optionally, the direction-selective apparatus is further configured to: transmit, to the CM by using the branch port, a downstream signal that is sent by a CMTS to the CM and that is entered from the input port, and transmit, to the CMTS by using the input port, a third upstream signal that is sent by the CM to the CMTS and that is entered from the branch port. In this way, it can be ensured that a service of the CM is normally performed.

For details about the CM that has the upstream signal collection and analysis function and the direction-selective apparatus, refer to the foregoing description, and details are not described herein again.

Figure 13:
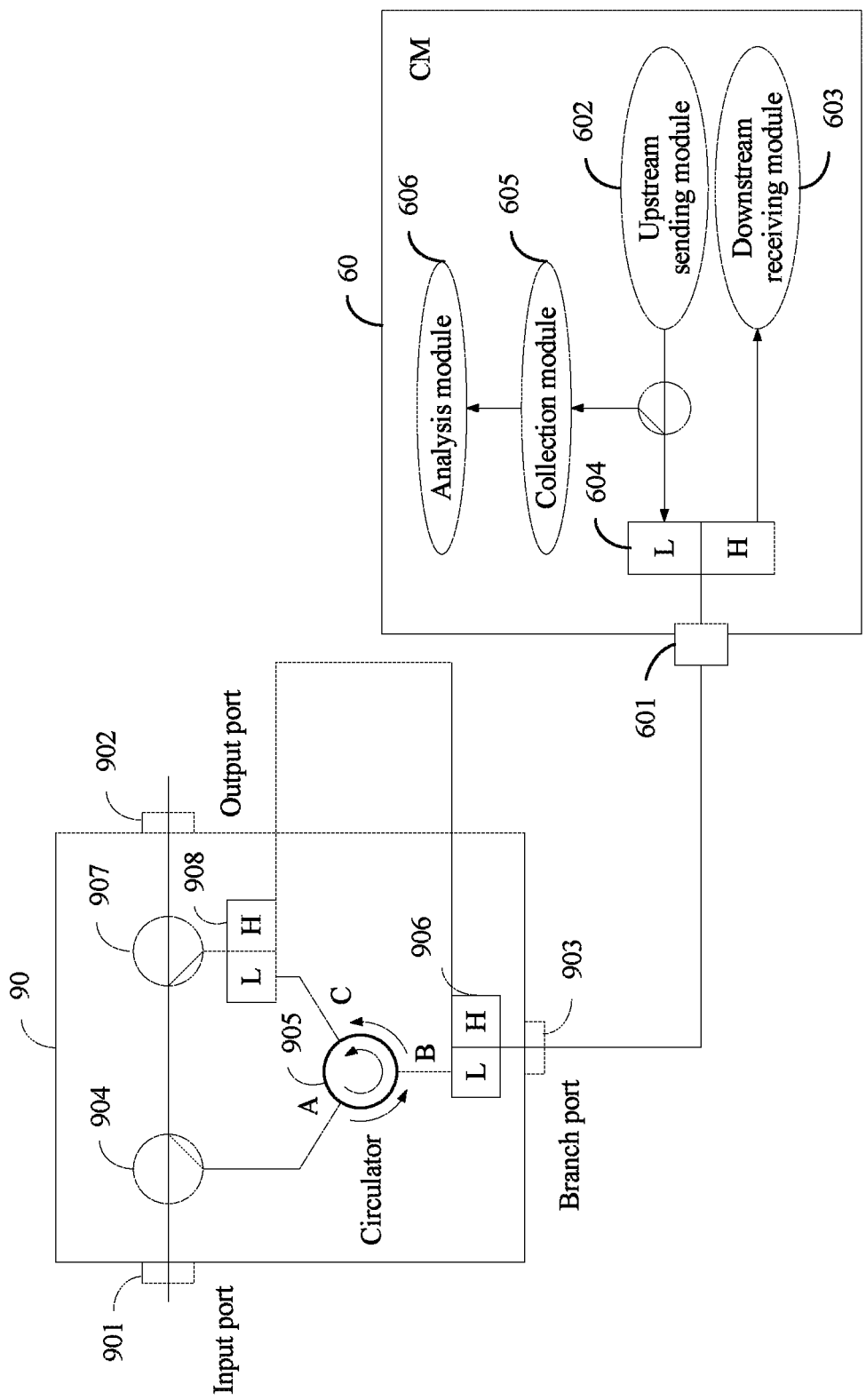
FIG. 13 is a schematic structural diagram of an integral part of an HFC network fault locating system according to an embodiment of this application.

As shown in FIG. 13, FIG. 13 is a schematic diagram obtained after the CM shown in FIG. 6A is combined with the direction-selective apparatus shown in FIG. 9A. A possible HFC network fault locating system may include a plurality of cascaded structures shown in FIG. 13. The system may comprehensively consider determining results about whether a fault and a specific type of fault occur that are of the CM in the plurality of structures shown in FIG. 13, and locate a possible fault in an HFC network.

Figure 1:
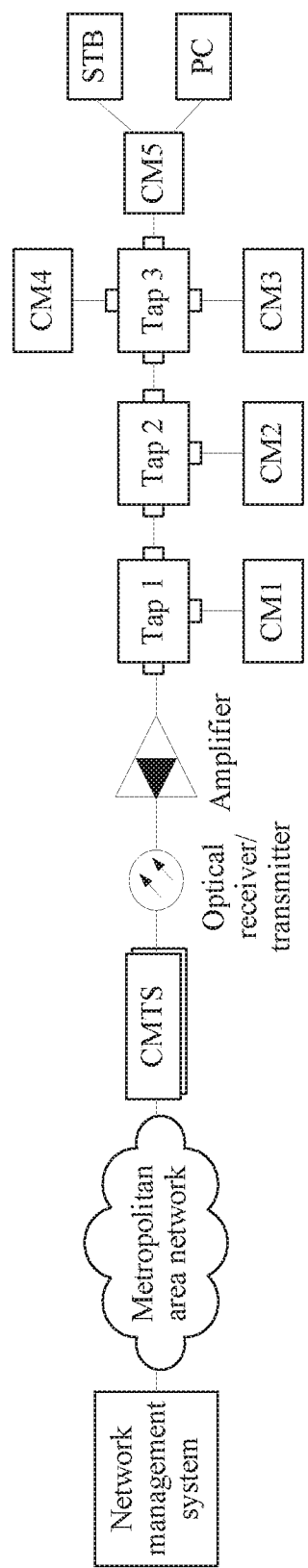
FIG. 1 is a schematic diagram of a typical HFC network in the prior art.

For example, it is assumed that all CMs in FIG. 1 are CMs that have the upstream signal collection and analysis function in this application, all taps in FIG. 1 are direction-selective apparatuses in this application, and these taps allow only upstream signals from a downstream to flow into branch ports of the taps. In this case, a CM may determine that a fault occurs in a downstream of the CM, provided that the CM detects the fault; and if a fault occurs in an upstream of a CM, the CM cannot detect the fault. For example, in FIG. 1, when only a CM1 detects intrusion noise but other CMs do not detect the intrusion noise, it may be determined that the intrusion noise occurs at a CM2. For another example, when a CM1 and a CM2 detect pulse noise but other CMs do not detect the pulse noise, it may be determined that the pulse noise occurs at one or more of a CM3, a CM4, and a CM5. In addition, the CM3, the CM4, and the CM5 may further determine, through strength detection, which CM or CMs generates/generate the pulse noise.

Figure 14:
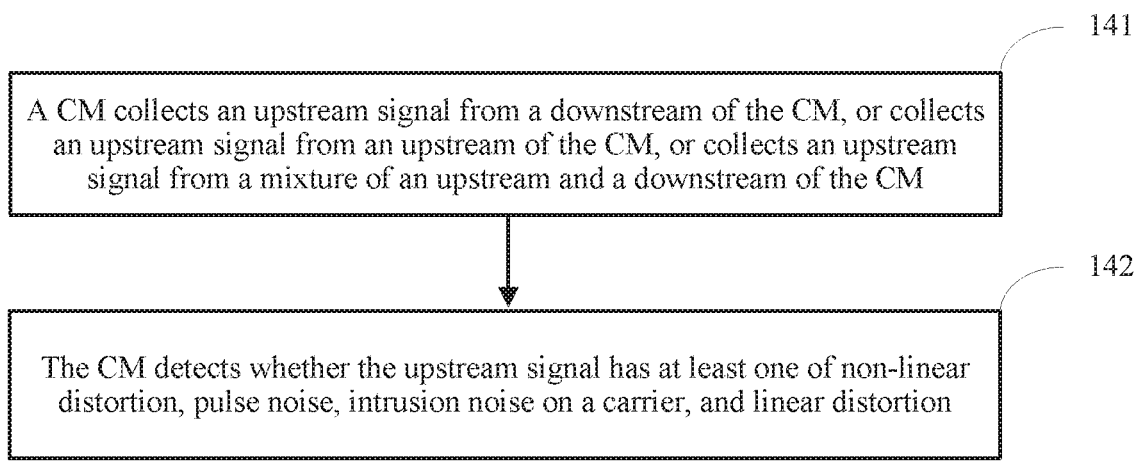
FIG. 14 is a flowchart of a fault detection method according to an embodiment of this application.

Based on the CM that has the upstream signal collection and analysis function and that is provided above, this application further provides a fault detection method. As shown in FIG. 14, the method includes the following steps:

Step 141: The CM collects an upstream signal from a downstream of the CM, or collects an upstream signal from an upstream of the CM, or collects an upstream signal from a mixture of an upstream and a downstream of the CM.

Step 142: The CM detects whether the upstream signal has at least one of non-linear distortion, pulse noise, intrusion noise on a carrier, and linear distortion.

Optionally, the CM may collect the upstream signal from the downstream of the CM, or collect the upstream signal from the upstream of the CM, or collect the upstream signal from the mixture of the upstream and the downstream of the CM in the following three manners:

In a first manner, the CM determines, based on an upstream bandwidth allocation mapping message delivered by a CMTS, a time interval corresponding to an empty timeslot or a silent probe signal, and collects the upstream signal within the time interval corresponding to the empty timeslot or the silent probe signal. The upstream bandwidth allocation mapping message is used to indicate a timeslot occupied by each CM under control of the CMTS, and the empty timeslot or the silent probe signal indicates a timeslot that is not occupied by any CM.

In a second manner, the CM determines, based on an upstream bandwidth allocation mapping message delivered by the CMTS, a service flow identifier SID of any one of upstream devices of the CM or downstream devices of the CM, and collects the upstream signal within a time interval corresponding to the SID of the any device.

In a third manner, the CM randomly collects the upstream signal.

Optionally, when detecting whether the upstream signal has non-linear distortion, the CM may draw a histogram based on a time-domain sampling value of the upstream signal, and if the drawn histogram does not conform to Gaussian distribution, the CM determines that the upstream signal has the non-linear distortion.

Optionally, after the CM collects the upstream signal from the downstream of the CM, or collects the upstream signal from the upstream of the CM, or collects the upstream signal from the mixture of the upstream and the downstream of the CM, the CM may collect the upstream signal obtained after passing through a band-pass filter, or may collect the upstream signal, and then input the collected upstream signal into a band-pass filter for processing, and a center frequency of the band-pass filter is outside an upstream operating band of the CM.

Correspondingly, when the CM detects whether the upstream signal has pulse noise, if energy in a passband of the band-pass filter reaches a specified threshold, the CM may determine that the upstream signal has the pulse noise.

Optionally, after the CM collects the upstream signal within the time interval corresponding to the empty timeslot or the silent probe signal, if the CM collects the upstream signal, the CM may determine, through spectrum analysis, whether the upstream signal has intrusion noise on a carrier.

Optionally, after the CM collects the upstream signal within the time interval corresponding to the SID of the any device, the CM may determine whether the upstream signal has linear distortion.

Optionally, after the CM collects the upstream signal within the time interval corresponding to the SID of the any device, the CM may further demodulate the upstream signal to obtain a signal quality parameter of the upstream signal, where the signal quality parameter includes an equalization coefficient, an MER, and a level; and/or the CM obtains a test signal of the any device; and compares the test signal with the upstream signal to obtain a transmission characteristic of a line between the CM and the any device, where the test signal is an initial state signal obtained when the upstream signal is sent from the any device.

In conclusion, in a technical solution provided in this application, a conventional CM is reconstructed, so that the CM can not only detect intrusion noise outside a carrier and white noise, but also detect other fault problems, such as non-linear distortion, pulse noise, intrusion noise on a carrier, and linear distortion, and a service is not affected while the CM detects a fault. In addition, a conventional tap is reconstructed in this application, so that the tap has direction selectivity. The tap can allow only an upstream signal entered from the output port of the tap to be transmitted to the CM to which the branch port of the tap is connected, without allowing an upstream signal entered from the input port of the tap to be transmitted to the CM to which the branch port of the tap is connected, so that once detecting a fault from the upstream signal, the CM can accurately determine, through locating, that the fault in an HFC network is located on the output port side of the tap. Alternatively, the tap can allow only an upstream signal entered from the input port of the tap to be transmitted to the CM to which the branch port of the tap is connected, without allowing an upstream signal entered from the output port of the tap to be transmitted to the CM to which the branch port of the tap is connected, so that once detecting a fault from the upstream signal, the CM can accurately determine, through locating, that the fault in an HFC network is located on the input port side of the tap.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A cable modem (CM), comprising:
a processor; and
a computer-readable storage medium storing a program that, when executed by the processor, causes the CM to:
collect an upstream signal, comprising,
determine, based on an upstream bandwidth allocation mapping message delivered by a cable modem termination access device (CMTS), a time interval corresponding to an empty timeslot or a silent probe signal, and collect the upstream signal within the time interval corresponding to the empty timeslot or the silent probe signal, wherein the upstream bandwidth allocation mapping message is used to indicate a timeslot occupied by each CM under control of the CMTS, and the empty timeslot or the silent probe signal indicates a timeslot that is not occupied by any CM; or
determine, based on an upstream bandwidth allocation mapping message delivered by the CMTS, a service flow identifier (SID) of a one of upstream devices or downstream devices of the CM, and collect the upstream signal within a time interval corresponding to the SID of the one of the upstream or downstream devices, and
detect whether the upstream signal has at least one of non-linear distortion, pulse noise, intrusion noise on a carrier, or linear distortion.

2. The CM according to claim 1, wherein the program, when executed by the processor, further causes the CM to:
draw a histogram based on a time-domain sampling value of the upstream signal; and
when the drawn histogram does not conform to Gaussian distribution, determine that the upstream signal has the non-linear distortion.

3. The CM according to claim 1, wherein:
the CM further comprises: a band-pass filter having a center frequency outside an upstream operating band of the CM; and
the program, when executed by the processor, further causes the CM to:
collect the upstream signal obtained after passing through the band-pass filter, and
when energy in a passband of the band-pass filter reaches a specified threshold, determine that the upstream signal has the pulse noise.

4. The CM according to claim 1, wherein the program, when executed by the processor, further causes the CM to:
after collecting the upstream signal within the time interval corresponding to the SID of the one device, determine whether the upstream signal has the linear distortion.

5. The CM according to claim 4, wherein the program, when executed by the processor, further causes the CM to:
demodulate the upstream signal to obtain a signal quality parameter of the upstream signal, wherein the signal quality parameter comprises an equalization coefficient, a modulation error ratio (MER), and a level;
obtain a test signal of the one device; and
compare the test signal with the upstream signal to obtain a transmission characteristic of a line between the CM and the one device, wherein the test signal is an initial state signal obtained when the upstream signal is sent from the one the upstream or downstream devices.

6. A hybrid fiber coaxial network fault locating system, comprising:
a cable modem (CM);
a direction-selective apparatus comprising a branch port connected to the CM, an input port connected to an upstream of the CM, and an output port connected to a downstream of the CM, wherein the direction-selective apparatus is configured to:
transmit, to the CM by using the branch port, a first upstream signal that is from the downstream of the CM and that is entered from the output port, and isolate a second upstream signal that is from the downstream of the CM and that is entered from the input port to prevent the second upstream signal from arriving at the CM, and when the CM detects that the first upstream signal has at least one of non-linear distortion, pulse noise, intrusion noise on a carrier, and linear distortion, the CM is configured to determine that the at least one of the non-linear distortion, the pulse noise, the intrusion noise on the carrier, and the linear distortion occurs on an output port side of the direction-selective apparatus, or
transmit the second upstream signal to the CM by using the branch port, and isolate the first upstream signal to prevent the first upstream signal from arriving at the CM, and when the CM detects that the second upstream signal has at least one of non-linear distortion, pulse noise, intrusion noise on a carrier, and linear distortion, the CM is configured to determine that the at least one of the non-linear distortion, the pulse noise, the intrusion noise on the carrier, and the linear distortion occurs on an input port side of the direction-selective apparatus.

7. The system according to claim 6, wherein the direction-selective apparatus is further configured to:
transmit, to the CM by using the branch port, a downstream signal that is sent by a cable modem termination system (CMTS) to the CM and that enters from the input port; and
transmit, to the CMTS by using the input port, a third upstream signal that is sent by the CM to the CMTS and that enters from the branch port.

8. The system according to claim 6, wherein when the direction-selective apparatus transmits the first upstream signal to the CM, and isolates the second upstream signal, the direction-selective apparatus further comprises:
a first tap, a circulator, a first duplexer, a second tap, and a second duplexer, wherein:
the output port is configured to send the first upstream signal to the circulator by using a branch link of the first tap,
the circulator is configured to unidirectionally transmit the first upstream signal to a low-pass filter of the first duplexer,
the low-pass filter of the first duplexer is configured to transmit the first upstream signal to the CM by using the branch port,
the input port is configured to send the second upstream signal to the second duplexer by using a branch link of the second tap,
the second duplexer is configured to send the second upstream signal to the circulator by using a low-pass filter of the second duplexer, and
the circulator is further configured to unidirectionally transmit the second upstream signal to the first tap, and the first tap is configured to send the second upstream signal to the output port by using the branch link of the first tap for sending.

9. The system according to claim 6, wherein when the direction-selective apparatus transmits the first upstream signal to the CM, and isolates the second upstream signal, the direction-selective apparatus further comprises:
a first tap, a first isolator, a distributor, a second isolator, a first duplexer, a second tap, and a second duplexer, wherein:
the output port is configured to send the first upstream signal to the first isolator by using a branch link of the first tap,
the first isolator is configured to unidirectionally transmit the first upstream signal to the distributor,
the distributor is configured to transmit the first upstream signal to a low-pass filter of the first duplexer,
the low-pass filter of the first duplexer is configured to transmit the first upstream signal to the CM by using the branch port,
the input port is configured to send the second upstream signal to the second duplexer by using a branch link of the second tap,
the second duplexer is configured to send the second upstream signal to the second isolator by using a low-pass filter of the second duplexer, and
the second isolator is configured to prevent the second upstream signal from entering the distributor.

10. A fault detection method, comprising:
collecting, by a cable modem (CM), an upstream signal by:
determining, based on an upstream bandwidth allocation mapping message delivered by a cable modem termination access device (CMTS), a time interval corresponding to an empty timeslot or a silent probe signal, and collecting the upstream signal within the time interval corresponding to the empty timeslot or the silent probe signal, wherein the upstream bandwidth allocation mapping message is used to indicate a timeslot occupied by each CM under control of the CMTS, and the empty timeslot or the silent probe signal indicates a timeslot that is not occupied by any CM, or
determining, based on an upstream bandwidth allocation mapping message delivered by the CMTS, a service flow identifier (SID) of a one of upstream devices or downstream devices of the CM, and collecting the upstream signal within a time interval corresponding to the SID of the one of the upstream or downstream devices; and
detecting, by the CM, whether the upstream signal has at least one of non-linear distortion, pulse noise, intrusion noise on a carrier, and linear distortion.

11. The method according to claim 10, wherein detecting, by the CM, whether the upstream signal has non-linear distortion comprises:
drawing, by the CM, a histogram based on a time-domain sampling value of the upstream signal; and
when the drawn histogram does not conform to Gaussian distribution, determining, by the CM, that the upstream signal has the non-linear distortion.

12. The method according to claim 10, wherein after collecting, by a CM, an upstream signal from a downstream of the CM, or collecting an upstream signal from an upstream of the CM, or collecting an upstream signal from a mixture of an upstream and a downstream of the CM, the method further comprises:
collecting, by the CM, the upstream signal obtained after passing through a band-pass filter, or collecting, by the CM, the upstream signal, and then inputting the collected upstream signal into a band-pass filter for processing, wherein a center frequency of the band-pass filter is outside an upstream operating band of the CM; and
when energy in a passband of the band-pass filter reaches a specified threshold, determining, by the CM, that the upstream signal has the pulse noise.

13. The method according to claim 10, wherein after collecting, by the CM, the upstream signal within the time interval corresponding to the empty timeslot or the silent probe signal, the method further comprises:
when the CM collects the upstream signal, determining, by the CM through spectrum analysis, whether the upstream signal has the intrusion noise on the carrier.

14. The method according to claim 10, wherein after collecting, by the CM, the upstream signal within a time interval corresponding to the SID of the one of the upstream or downstream devices, the method further comprises:
determining, by the CM, whether the upstream signal has the linear distortion.

15. The method according to claim 14, wherein after collecting, by the CM, the upstream signal within a time interval corresponding to the SID of the one of the upstream or downstream devices, the method further comprises:
demodulating, by the CM, the upstream signal to obtain a signal quality parameter of the upstream signal, wherein the signal quality parameter comprises an equalization coefficient, a modulation error ratio MER, and a level; and/or
obtaining, by the CM, a test signal of the any device; and comparing the test signal with the upstream signal to obtain a transmission characteristic of a line between the CM and the any device, wherein the test signal is an initial state signal obtained when the upstream signal is sent from the one of the upstream or downstream devices.

* * * * *